US012574849B2

(12) United States Patent
Patra et al.

(10) Patent No.: US 12,574,849 B2
(45) Date of Patent: Mar. 10, 2026

(54) TECHNIQUES FOR BITRATE CONTROL IN WIRELESS COMMUNICATIONS

(71) Applicant: QUALCOMM Incorporated, San Diego, CA (US)

(72) Inventors: Gopinath Patra, Midnapore (IN); Richard Turner, Belfast (GB); Laurent Wojcieszak, Belfast (GB); Srikant Kuppa, Fremont, CA (US); Mayank Batra, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 17/947,653

(22) Filed: Sep. 19, 2022

(65) Prior Publication Data

US 2024/0098640 A1     Mar. 21, 2024

(51) Int. Cl.
*H04W 52/02* (2009.01)

(52) U.S. Cl.
CPC ... *H04W 52/0232* (2013.01); *H04W 52/0216* (2013.01)

(58) Field of Classification Search
CPC ......... H04W 52/0219; H04W 52/0235; H04W 52/02; H04W 52/0254; H04L 47/11; H04L 47/10; H04L 47/2416; H04S 1/007; H04J 3/0632; H04R 1/1016; H04R 9/06; H04R 5/033; H04R 25/554; H04B 1/3827
See application file for complete search history.

(56) References Cited

U.S. PATENT DOCUMENTS

| | | | |
|---|---|---|---|
| 2013/0295921 A1 | 11/2013 | Bhargava et al. | |
| 2019/0306790 A1 | 10/2019 | Kottontavida et al. | |
| 2020/0008095 A1 | 1/2020 | Patil et al. | |
| 2020/0221381 A1* | 7/2020 | Homchaudhuri | ........................... H04W 52/0235 |
| 2021/0345243 A1* | 11/2021 | Yun | ........................ H04W 76/27 |
| 2022/0141680 A1* | 5/2022 | Min | ...................... H04W 28/02 |

(Continued)

FOREIGN PATENT DOCUMENTS

WO     WO-2022235092 A1     11/2022

OTHER PUBLICATIONS

Partial International Search Report—PCT/US2023/073479—ISA/EPO—Jan. 2, 2024.

(Continued)

*Primary Examiner* — Yee F Lam
(74) *Attorney, Agent, or Firm* — Holland & Hart LLP

(57)     ABSTRACT

Methods, systems, and devices for wireless communications are described. The described techniques generally provide for modifying a bit rate of a real-time stream at a station (STA). The STA may determine an average wake duration within an interval for communications with an access point (AP), and may compare the average to a target active duration for efficient power usage. In some other cases, the STA may learn a scheduling pattern of the AP, and may reduce the bitrate to eliminate the need for a portion of the wake duration having relatively lower data transmissions. Modifying the bit rate may support adjusting the active duration of the STA to be closer to the target active duration while maintaining a similar quality of the real-time stream (such as, a lossless stream).

25 Claims, 15 Drawing Sheets

(56) References Cited

U.S. PATENT DOCUMENTS

2022/0201533  A1      6/2022  Sehgal et al.
2024/0040458  A1*    2/2024  Nakayama ........ H04W 36/1446

OTHER PUBLICATIONS

Singh H., et al., "Enhanced Power Saving in Next Generation Wireless LANs", 2006 IEEE 64th Vehicular Technology Conference, VTC 2006-FALL, Sep. 25-28, 2006, Montreal, Quebec, Canada, Piscataway, NJ, IEEE Operations Center, Sep. 1, 2006, 5 Pages, XP031051494, The whole Document.
International Search Report and Written Opinion—PCT/US2023/073479—ISA/EPO—Feb. 9, 2024.

* cited by examiner

201

202

Wake Duration  505
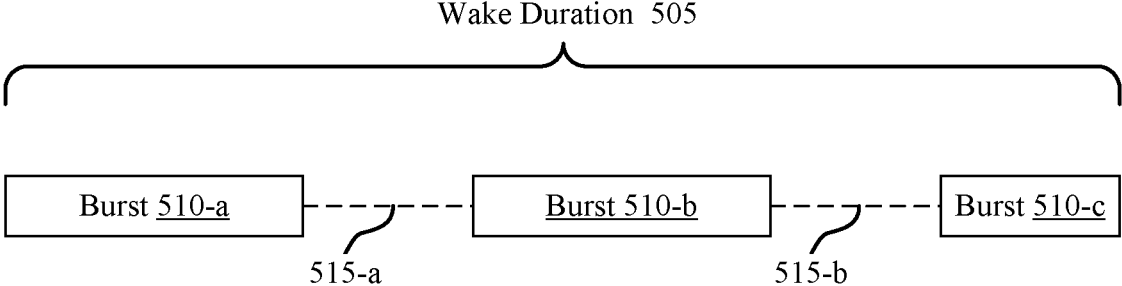
FIG. 5

Determine an average wake duration of a wireless device based on one or more wake durations of the wireless device over one or more previous time windows

1205

Modify a bit rate of a real-time stream at the wireless device based on the average wake duration and a threshold time period

1210

Transmit the real-time stream in accordance with the modified bit rate

1215

1200

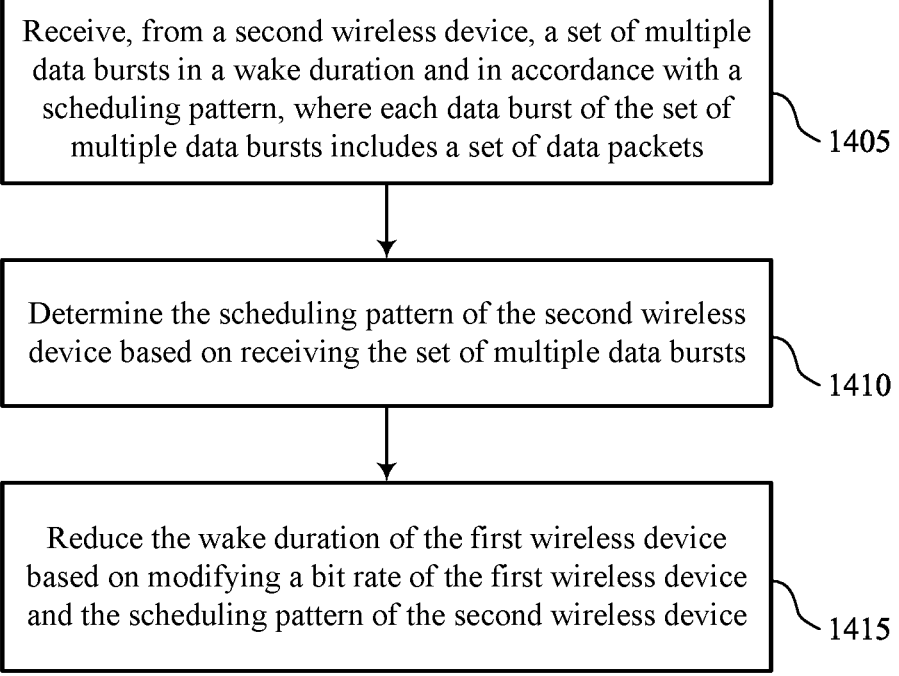

Receive, from a second wireless device, a set of multiple data bursts in a wake duration and in accordance with a scheduling pattern, where each data burst of the set of multiple data bursts includes a set of data packets

1405

Determine the scheduling pattern of the second wireless device based on receiving the set of multiple data bursts

1410

Reduce the wake duration of the first wireless device based on modifying a bit rate of the first wireless device and the scheduling pattern of the second wireless device

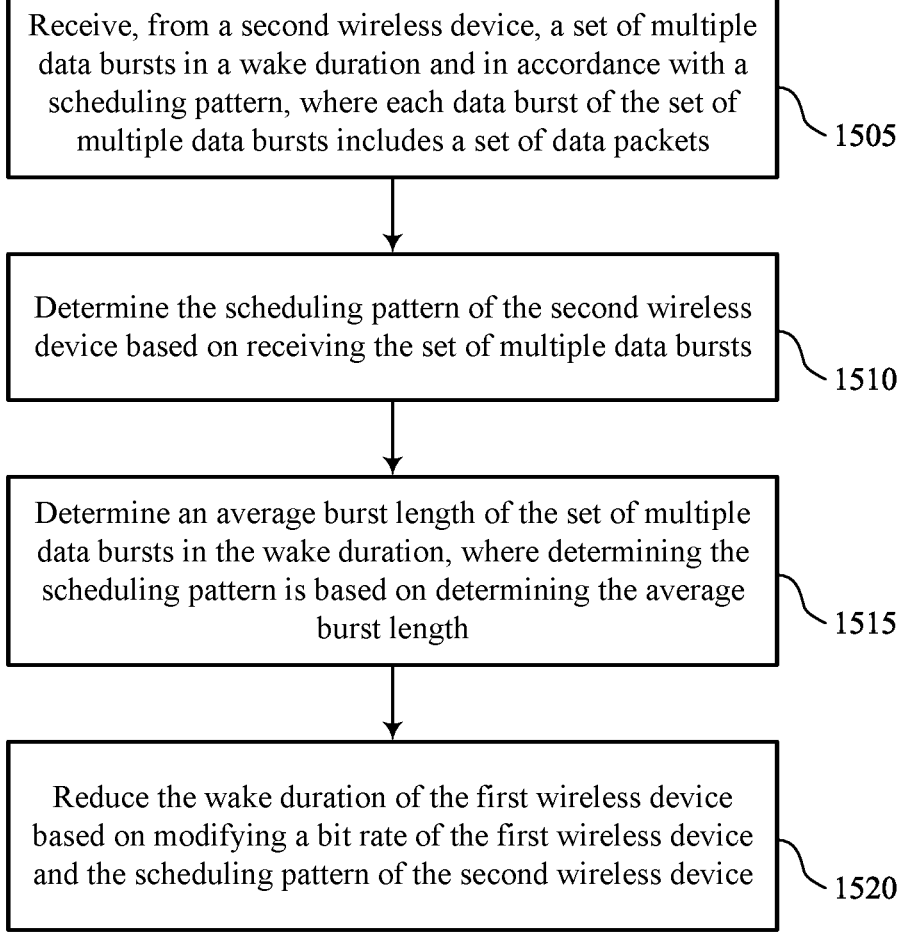

Receive, from a second wireless device, a set of multiple data bursts in a wake duration and in accordance with a scheduling pattern, where each data burst of the set of multiple data bursts includes a set of data packets

1505

Determine the scheduling pattern of the second wireless device based on receiving the set of multiple data bursts

1510

Determine an average burst length of the set of multiple data bursts in the wake duration, where determining the scheduling pattern is based on determining the average burst length

1515

Reduce the wake duration of the first wireless device based on modifying a bit rate of the first wireless device and the scheduling pattern of the second wireless device

TECHNIQUES FOR BITRATE CONTROL IN WIRELESS COMMUNICATIONS

BACKGROUND

The following relates to wireless communications, including techniques for bitrate control in wireless communications.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (e.g., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

In some wireless communications systems, such as in Wi-Fi networks, a wireless device may be operable to transmit data at a relatively high rate (e.g., 192 Kbps). In some examples, an Extended Personal Area Network (XPAN) interface may be implemented directly between a wireless device, such as a STA, and a peripheral device (e.g., headphones, a virtual reality headset, sensors, or the like) in a peer-to-peer (P2P) stream. However, supporting the XPAN interface may be power intensive for the wireless device, and may adversely affect a battery life (e.g., an operable duration between recharges) of the wireless device.

SUMMARY

The described techniques relate to improved methods, systems, devices, or apparatuses that support techniques for bitrate control in wireless communications. Generally, the described techniques provide for determining a wake duration of a wireless device, such as a STA or a peripheral device, within an interval and comparing the wake duration to an average wake duration of one or more previous intervals. For example, a wireless device may calculate a moving average of one or more previous wake durations, and may modify a bit rate for subsequent communications based on a difference between the average wake duration and the target wake duration. Additionally, or alternatively, the wireless device may identify a bursting pattern, a scheduling pattern, or both, during the wake duration, associated with one or more APs to determine inefficient usage of wake duration. That is, the wireless device may identify an under-utilized burst (e.g., a burst with a relatively short length), and may adjust the bit rate to satisfy a target wake duration (e.g., reduce the wake duration).

A method for wireless communication is described. The method may include determining, within a time window, an average wake duration of a wireless device based on one or more wake durations of the wireless device over one or more previous time windows, modifying a bit rate of a real-time stream at the wireless device based on the average wake duration and a threshold time period, and transmitting the real-time stream in accordance with the modified bit rate.

An apparatus for wireless communication is described. The apparatus may include a processor, memory coupled with the processor, and instructions stored in the memory. The instructions may be executable by the processor to cause the apparatus to determine, within a time window, an average wake duration of a wireless device based on one or more wake durations of the wireless device over one or more previous time windows, modify a bit rate of a real-time stream at the wireless device based on the average wake duration and a threshold time period, and transmit the real-time stream in accordance with the modified bit rate.

Another apparatus for wireless communication is described. The apparatus may include means for determining, within a time window, an average wake duration of a wireless device based on one or more wake durations of the wireless device over one or more previous time windows, means for modifying a bit rate of a real-time stream at the wireless device based on the average wake duration and a threshold time period, and means for transmitting the real-time stream in accordance with the modified bit rate.

A non-transitory computer-readable medium storing code for wireless communication is described. The code may include instructions executable by a processor to determine, within a time window, an average wake duration of a wireless device based on one or more wake durations of the wireless device over one or more previous time windows, modify a bit rate of a real-time stream at the wireless device based on the average wake duration and a threshold time period, and transmit the real-time stream in accordance with the modified bit rate.

Some examples of the method, apparatuses, and non-transitory computer-readable medium described herein may further include operations, features, means, or instructions for determining a target wake duration for the real-time stream and comparing the average wake duration to the target wake duration, where modifying the bit rate of the real-time stream may be based on the comparing.

Some examples of the method, apparatuses, and non-transitory computer-readable medium described herein may further include operations, features, means, or instructions for determining that the average wake duration may be shorter than the target wake duration, where modifying the bit rate of the real-time stream includes increasing the bit rate of the real-time stream.

Some examples of the method, apparatuses, and non-transitory computer-readable medium described herein may further include operations, features, means, or instructions for determining that the average wake duration may be longer than the target wake duration, where modifying the bit rate of the real-time stream includes decreasing the bit rate of the real-time stream.

In some examples of the method, apparatuses, and non-transitory computer-readable medium described herein, the target wake duration may be based on a latency threshold for the real-time stream, a quality threshold for the real-time stream, a power budget for the wireless device, or any combination thereof.

Some examples of the method, apparatuses, and non-transitory computer-readable medium described herein may further include operations, features, means, or instructions for modifying the bit rate of the real-time stream may be based on a congestion level of a channel associated with the real-time stream.

In some examples of the method, apparatuses, and non-transitory computer-readable medium described herein, determining the average wake time service period utilization duration may include operations, features, means, or instructions for determining a moving average of a quantity of the one or more previous wake durations.

In some examples of the method, apparatuses, and non-transitory computer-readable medium described herein, determining the average wake time service period utilization duration may include operations, features, means, or instructions for determining an average duration for a first recipient device associated with the real-time stream and determining an average wake duration for a second recipient device associated with the real-time stream.

Some examples of the method, apparatuses, and non-transitory computer-readable medium described herein may further include operations, features, means, or instructions for inputting one or more parameters associated with the first recipient device to an encoder associated with the wireless device and inputting one or more parameters associated with the second recipient device to the encoder associated with the wireless device, where modifying the bit rate of the real-time stream may be based on inputting the one or more parameters associated with the first recipient device and the one or more parameters associated with the second recipient device to the encoder.

In some examples of the method, apparatuses, and non-transitory computer-readable medium described herein, the one or more parameters includes a supported bit rate, an access time, a received signal strength indicator, the average wake duration, a quantity of attempts to re-establish connection with the wireless device, a quantity of packets dropped, or any combination thereof.

Some examples of the method, apparatuses, and non-transitory computer-readable medium described herein may further include operations, features, means, or instructions for determining a start time of a wake duration for the second recipient device, where the start time may be offset by a target wake duration.

In some examples of the method, apparatuses, and non-transitory computer-readable medium described herein, the first recipient device includes a left earbud and the second recipient device includes a right earbud.

In some examples of the method, apparatuses, and non-transitory computer-readable medium described herein, the wireless device may be connected to a home access point in a home network or a set of access points in a mesh home network.

In some examples of the method, apparatuses, and non-transitory computer-readable medium described herein, the real-time stream includes an audio stream, a video stream, a phone call, haptic feedback, or any combination thereof.

A method for wireless communication at a first wireless device is described. The method may include receiving, from a second wireless device, a set of multiple data bursts in a wake duration and in accordance with a scheduling pattern, where each data burst of the set of multiple data bursts includes a set of data packets, determining the scheduling pattern of the second wireless device based on receiving the set of multiple data bursts, and reducing the wake duration of the first wireless device based on modifying a bit rate of the first wireless device and the scheduling pattern of the second wireless device.

An apparatus for wireless communication at a first wireless device is described. The apparatus may include a processor, memory coupled with the processor, and instructions stored in the memory. The instructions may be executable by the processor to cause the apparatus to receive, from a second wireless device, a set of multiple data bursts in a wake duration and in accordance with a scheduling pattern, where each data burst of the set of multiple data bursts includes a set of data packets, determine the scheduling pattern of the second wireless device based on receiving the set of multiple data bursts, and reduce the wake duration of the first wireless device based on modifying a bit rate of the first wireless device and the scheduling pattern of the second wireless device.

Another apparatus for wireless communication at a first wireless device is described. The apparatus may include means for receiving, from a second wireless device, a set of multiple data bursts in a wake duration and in accordance with a scheduling pattern, where each data burst of the set of multiple data bursts includes a set of data packets, means for determining the scheduling pattern of the second wireless device based on receiving the set of multiple data bursts, and means for reducing the wake duration of the first wireless device based on modifying a bit rate of the first wireless device and the scheduling pattern of the second wireless device.

A non-transitory computer-readable medium storing code for wireless communication at a first wireless device is described. The code may include instructions executable by a processor to receive, from a second wireless device, a set of multiple data bursts in a wake duration and in accordance with a scheduling pattern, where each data burst of the set of multiple data bursts includes a set of data packets, determine the scheduling pattern of the second wireless device based on receiving the set of multiple data bursts, and reduce the wake duration of the first wireless device based on modifying a bit rate of the first wireless device and the scheduling pattern of the second wireless device.

Some examples of the method, apparatuses, and non-transitory computer-readable medium described herein may further include operations, features, means, or instructions for determining an average burst length of the set of multiple data bursts in the wake duration, where determining the scheduling pattern may be based on determining the average burst length.

Some examples of the method, apparatuses, and non-transitory computer-readable medium described herein may further include operations, features, means, or instructions for determining a first power usage value associated with receiving each data burst of the set of multiple data bursts and determining a second power usage value associated with refraining from receiving a last data burst of the set of multiple data bursts, where reducing the wake duration of the first wireless device may be based on determining the first power usage value and the second power usage value.

Some examples of the method, apparatuses, and non-transitory computer-readable medium described herein may further include operations, features, means, or instructions for excluding a last data burst of the set of multiple data bursts in the wake duration based on the scheduling pattern, where determining the average burst length of the set of multiple data bursts includes determining an average burst length of a remaining quantity of data bursts of the set of multiple data bursts in the wake duration.

Some examples of the method, apparatuses, and non-transitory computer-readable medium described herein may further include operations, features, means, or instructions for determining an average burst length of a last data burst of a set of multiple previous wake durations, where excluding the last data burst of the set of multiple data bursts in the wake duration may be based on the average burst length.

Some examples of the method, apparatuses, and non-transitory computer-readable medium described herein may further include operations, features, means, or instructions for reducing the wake duration of the first wireless device may be based on the average burst length of the last burst being shorter than the average burst length of the remaining quantity of data bursts.

Some examples of the method, apparatuses, and non-transitory computer-readable medium described herein may further include operations, features, means, or instructions for reducing the wake duration of the first wireless device may be based on a threshold loss of quality for the first wireless device.

Some examples of the method, apparatuses, and non-transitory computer-readable medium described herein may further include operations, features, means, or instructions for determining a maximum burst size, where reducing the wake duration of the first wireless device may be based on the maximum burst size.

Some examples of the method, apparatuses, and non-transitory computer-readable medium described herein may further include operations, features, means, or instructions for receiving, from at least one peripheral device, an indication of a modified bit rate of the first wireless device, where the modified bit rate may be based on the set of multiple data bursts, and where reducing the wake duration of the first wireless device may be based on receiving the indication of the modified bit rate.

BRIEF DESCRIPTION OF THE DRAWINGS

FIG. 5 illustrates an example of a timing diagram that supports techniques for bitrate control in wireless communications in accordance with one or more aspects of the present disclosure.

FIGS. 12 through 15 show flowcharts illustrating methods that support techniques for bitrate control in wireless communications in accordance with one or more aspects of the present disclosure.

DETAILED DESCRIPTION

Figure 1:
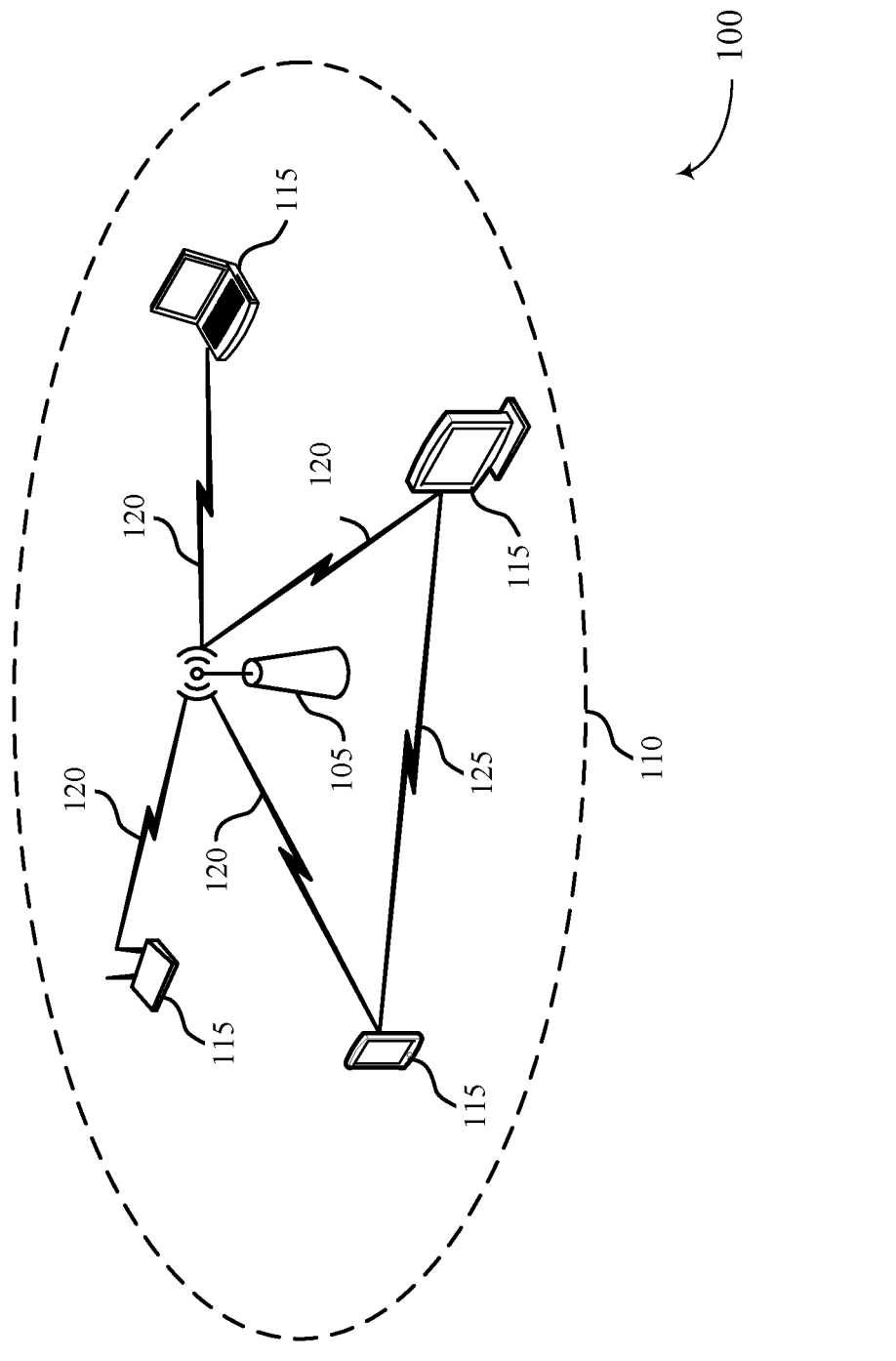
FIG. 1 illustrates an example of a wireless communications system that supports techniques for bitrate control in wireless communications in accordance with aspects of the present disclosure.

In some wireless communications systems, such as Wi-Fi networks, a wireless device may be operable to transmit data at a relatively high rate (e.g., 192 Kbps). For example, the wireless device may utilize an Extended Personal Area Network (XPAN) interface to communicate with one or more other wireless devices at a faster rate (e.g., to enable lossless real time streaming). An XPAN interface may support a computer network that connects computers or devices within an extended range. In some examples, the XPAN interface may be implemented directly between a wireless device (e.g., a station (STA), a mobile device, a client device, a soft access point (AP), a group peer-to-peer (P2P) owner, or the like) and a peripheral device (e.g., headphones, a virtual reality headset, sensors, or the like) in a P2P stream. Additionally, or alternatively, the XPAN interface may be implemented by an AP, which may stream data to the STA and the peripheral device. By utilizing an XPAN interface, wireless devices may provide enhanced user experience (by enabling a user to be mobile or increasing an operable mobile range for a home or office scenario) compared to other interfaces (e.g., Bluetooth). In some examples, usage of an XPAN interface may incur adverse effects associated with a battery life (e.g., an operable duration between recharges) of the wireless devices. For instance, communicating in a congested channel (e.g., a relatively high quantity of wireless devices using channel resources), switching from a first home network (e.g., a mesh network) to a second home network, or both, while maintaining a relatively high quality of service (QoS) (e.g., lossless streaming) provided by the XPAN interface may be associated with (e.g., limit or reduce) the battery life of the wireless device.

To support power savings for a wireless device, such as by extending battery life, the wireless device may mitigate or reduce durations corresponding to an active (e.g., ON) state of the wireless device. That is, the wireless device may periodically wake (e.g., become active) for a portion of an interval. Additionally, or alternatively, the wireless device may determine a target wake duration (e.g., that supports power savings) within the interval. In some examples, the target wake duration of an interval (e.g., a 802.11ax target wake time (TWT) service period of a service interval or a wake duration of an interval according to achieved using any power savings protocol) may correspond to an active duration for a peripheral device, such as an audio device connected to a wireless device. The wireless device may compare the target wake duration to an average wake duration of one or more previous intervals. For example, the wireless device may calculate a moving average of one or more previous wake durations, and may modify a bit rate for subsequent communications based on a difference between the average wake duration and the target wake duration. Additionally, or alternatively, the wireless device may identify a bursting pattern, a scheduling pattern, or both, of one or more APs (e.g., a single AP, a set of APs in a mesh network) to determine inefficient usage of power within a wake duration of an interval. In some instances, the wireless device may identify an underutilized burst (e.g., a burst with a relatively short length), and may adjust the bit rate to satisfy a target wake duration or reduce a wake duration (e.g., not including the underutilized burst).

Aspects of the disclosure are initially described in the context of a wireless communications system. Aspects of the disclosure are further illustrated by and described with reference to timing diagrams, system diagrams, and process flows. Aspects of the disclosure are further illustrated by and described with reference to apparatus diagrams, system diagrams, and flowcharts that relate to techniques for bitrate control in wireless communications FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an ESS. The various STAs 115 in the network are able to communicate with one another through the AP 105. Also shown is a coverage area 110 of the AP 105, which may represent a BSS of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11ay, 802.11ba, 802.11be, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some examples, a wireless device (e.g., STA 115 or other wireless devices) may determine a target wake duration within a given interval (e.g., to support power savings). For instance, the wireless device may determine a duration for a peripheral device to remain active for communications within the interval. In some examples, a target wake duration may correspond to target ON time for a peripheral device within the interval. The wireless device may then compare the target wake duration to an average wake duration of one or more previous intervals. For example, the wireless device may calculate a moving average of one or more previous wake durations, and may reduce a bit rate for subsequent communications (e.g., a real-time stream) based on the average wake duration exceeding the target wake duration. In some other cases, the wireless device may identify a bursting pattern, a scheduling pattern, or both, within the wake duration, of one or more second wireless devices (e.g., a home AP 105 in a home network, a set of APs 105 in a mesh home network) to determine inefficient usage of power. That is, the wireless device may identify an underutilized burst (e.g., a burst with a relatively short length), within the wake duration and may adjust the bit rate to satisfy a target wake duration (e.g., excluding the underutilized burst from a wake duration).

Figures 2A, 2B:
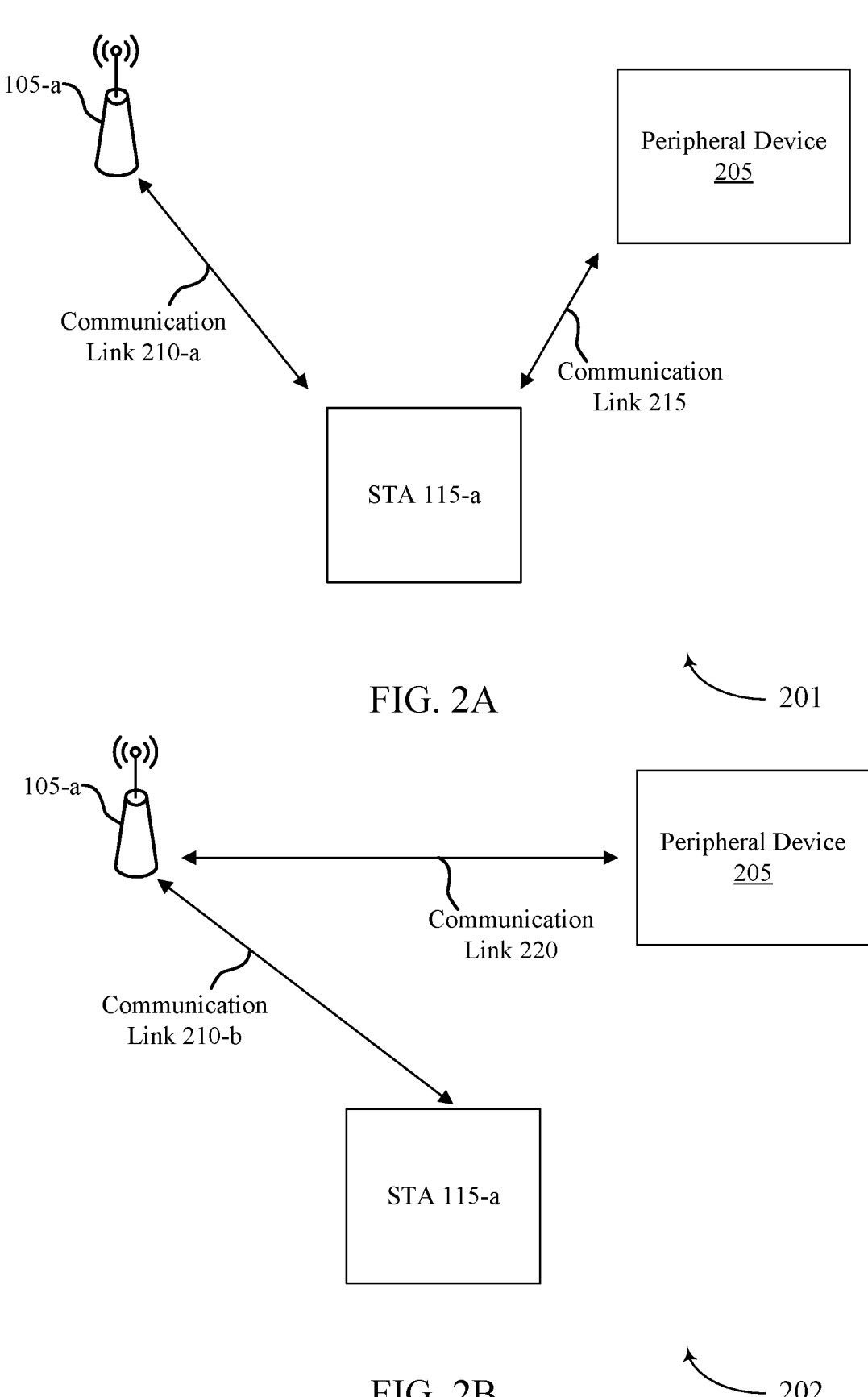
FIGS. 2A and 2B illustrate examples of wireless communications systems that support techniques for bitrate control in wireless communications in accordance with one or more aspects of the present disclosure.

FIGS. 2A and 2B illustrate examples of wireless communications systems 201 and 202 that support techniques for bitrate control in wireless communications in accordance with one or more aspects of the present disclosure. The wireless communications systems 201 and 202 may implement aspects of the wireless communications system 100. For example, the wireless communications systems 201 and 202 may be implemented by an AP 105-a and a STA 115-a, which may be examples of an AP 105 and a STA 115 as described with reference to FIG. 1. In some cases, the AP 105-a and the STA 115-a may communicate via a communication link 210 (e.g., communication link 210-a and communication link 210-b), the STA 115-a and a peripheral device 205 may communicate via a communication link 215, and the AP 105-a and the peripheral device 205 may communicate via a communications link 220.

The wireless communications systems 201 and 202 may support real-time streaming between devices (e.g., direct P2P streaming) via an XPAN interface. For example, the wireless communications system 201, as illustrated by FIG. 2A, may be an example of a directed network topology (e.g., a public network), which may support real-time streaming (e.g., an audio stream, a video stream, a phone call, haptic feedback, or the like) between the STA 115-a and the peripheral device 205 (e.g., a set of earbuds). That is, the STA 115-a may receive data from the AP 105-a via the communication link 210-a (e.g., a 5 GHz 35 Mbps communication link), and then may stream the data to the peripheral device 205 via the communication link 215. Additionally, or alternatively, the wireless communications system 202 illustrated by FIG. 2B may be an example of a home network topology (e.g., a private network), which may support real-time streaming between the AP 105-a and the peripheral device 205 via the communication link 220 (e.g., a Wi-Fi link).

In some examples, streaming data via the XPAN interface may enable lossless streaming (e.g., 192 Kbps 24 bit streaming). For example, the XPAN interface may support communications with relatively more available bandwidth (e.g., compared to a Bluetooth classic system or Bluetooth low-energy system), and may utilize a Wi-Fi link (e.g., with a relatively higher bandwidth) to communicate via data burst-ing (e.g., 100 ms bursting). However, using an XPAN interface for real-time streaming may incur variations in a battery life of a communicating device. For example, the peripheral device 205 may be an example of a device with a relatively low battery capacity (e.g., an audio headset), and may experience a reduced or limited battery life due to receiving data via the XPAN interface. Further, communi-cating via a congested channel, switching between various home network topologies (e.g., mesh networks), or both, may affect (e.g., reduce or limit) the battery life of the peripheral device 205.

By implementing techniques described herein, a wireless device (e.g., the STA 115-*a* or the AP 105-*a*) may be operable to improve (e.g., maintain or enhance) a battery life of the wireless device, a device receiving a real-time stream (e.g., the peripheral device 205), or both, while maintaining a QoS (e.g., lossless) associated with an XPAN interface. For example, a wireless device (e.g., the STA 115-*a*) may modify a bit rate of a real-time stream transmitted to the peripheral device 205, which may support a consistent battery life of the peripheral device 205. Additionally, or alternatively, a wireless device (e.g., the peripheral device 205) may receive one or more sets of data bursts during one or more intervals (e.g. 100 ms) from one or more second wireless devices (e.g., the AP 105-*a*, a set of APs 105), and may determine a scheduling pattern of the one or more second wireless devices. That is, the peripheral device 205 may identify inefficient use of resources (e.g., airtime) based on the scheduling pattern and may modify (e.g., terminate, reduce bit rate, or both) communications with the AP 105-*a* accordingly. Additionally, or alternatively, the peripheral device 205 may indicate the inefficient resource usage to a connected wireless device (e.g., transmitted to an encoder of the STA 115-*a*).

Figure 3:
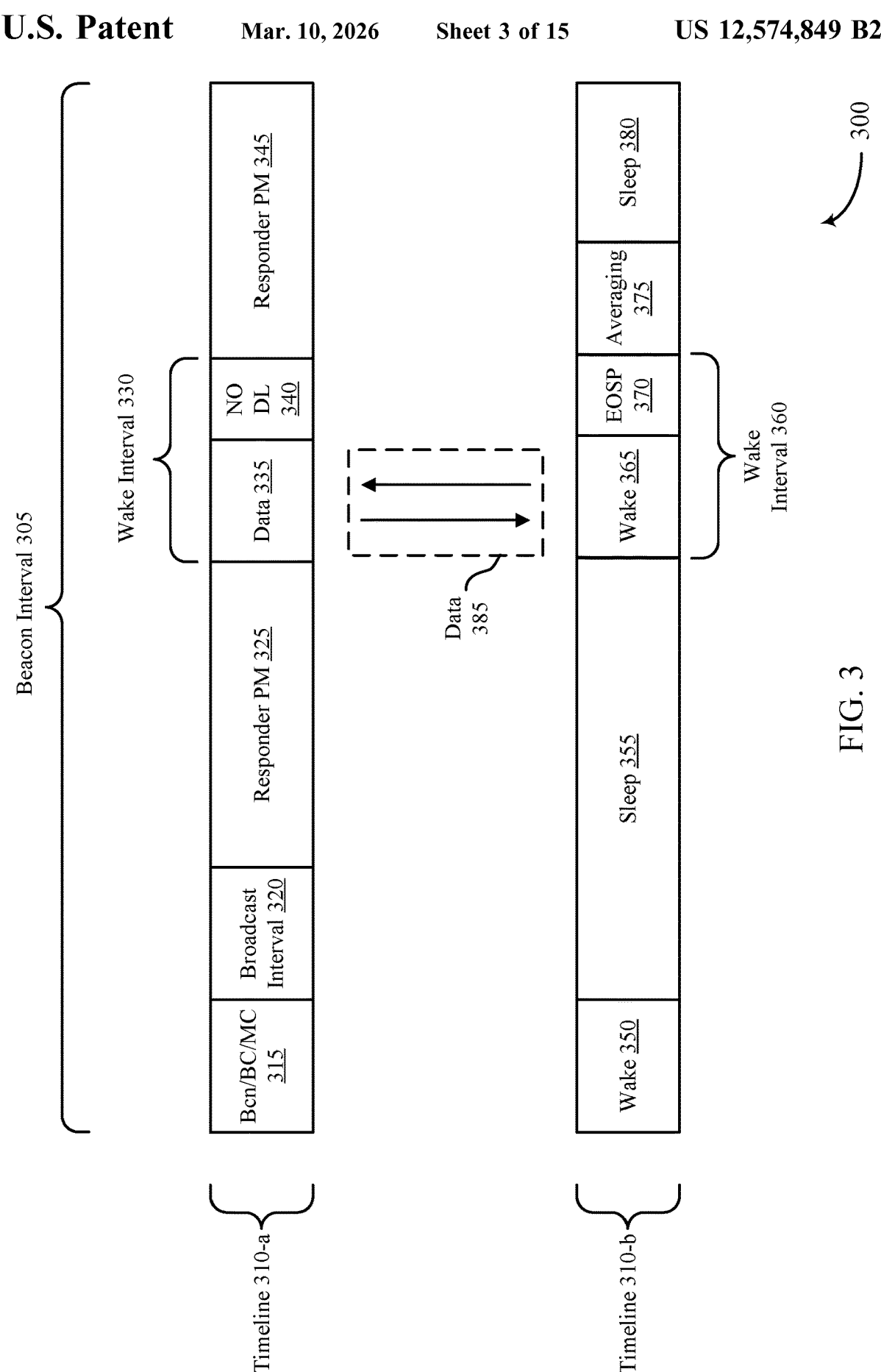
FIG. 3 illustrates an example of a timing diagram that supports techniques for bitrate control in wireless communications in accordance with one or more aspects of the present disclosure.

FIG. 3 illustrates an example of a timing diagram 300 that supports techniques for bitrate control in wireless commu-nications in accordance with one or more aspects of the present disclosure. In some cases, the timing diagram 300 may be implemented by aspects of the wireless communi-cations systems 201 and 202, as described with reference to FIGS. 2A and 2B, respectively. For example, the timing diagram 300 may illustrate a beacon interval 305 (e.g., a TWT service period, a power savings protocol interval, or the like), during which an AP 105 (e.g., the AP 105-*a*) may perform operations in accordance with a timeline 310-*a* and a wireless device (e.g., the STA 115-*a*) may perform opera-tions in accordance with a timeline 310-*b*. In some examples, the wireless devices may perform operations at different times than illustrated in the timing diagram 300, or may be aligned differently.

In some examples, the AP 105 (e.g., operating according to the timeline 310-*a*) may initiate the beacon interval 305 by transmitting a beacon or broadcast or multicast signal 315, and may then broadcast a wake schedule during a broadcast interval 320. That is, the AP 105 may schedule one or more STA 115 or other wireless devices with a time period or a set of time periods during which a respective set of wireless devices (e.g., ten STAs 115) are to wake in order to exchange frames with other wireless devices. During the responder power management (PM) 325, the AP 105 may wake wireless devices (e.g., STAs 115 or other wireless devices) scheduled prior to the wireless device operating according to the timeline 310-*b*. In some cases, the AP 105 may initiate an N time unit wake interval 330 during which the wireless device operating according to the timeline 310-*b* is to exchange data 385 with the AP 105. That is, the AP 105 may configure the wireless device to wake for N time units (e.g., N milliseconds) to perform communica-tions. The N time unit wake interval 330 may include a data portion 335 and a no downlink (DL) portion 340, which may represent a first portion of the N time unit wake interval 330 for data communications and a second portion of the N time unit wake interval 330 without data communications, respectively. In some cases, during a responder PM duration 345, the AP 105 may communicate with one or more sets of other wireless devices scheduled after the wireless device operating according to the timeline 310-*b* (e.g., in one or more subsequent wake interval durations). In some examples, the AP 105 may be a soft AP 105, which may run on a client device (e.g., a mobile phone).

In some examples, the wireless device (e.g., STA 115 or other wireless devices) may perform operations in accor-dance with the timeline 310-*b* concurrently with the AP 105 performing operations in accordance with the timeline 310-*a*. For example, the wireless device may activate during a wake duration 350, which may align with the beacon or broadcast or multicast signal 315 transmitted by the AP 105. The wireless device may then deactivate during a sleep duration 355, which may correspond to the broadcast inter-val 320 and the responder PM 325 performed by the AP 105 (e.g., activating other STAs 115). In some cases, the wireless device may activate during a wake interval 360, which may be an example of the N time unit wake interval 330 scheduled by the AP 105. The wireless device may exchange data 385 with the AP 105 during a wake duration 365, and may then receive an end-of-service-period (EOSP) message 370 from the AP 105 terminating the wake interval 360. In some examples (such as when operating according to an 802.11ax TWT protocol), the wireless device may calculate an average wake duration utilization (e.g., the portion of the wake duration during which data is communicated) during an averaging duration 375. That is, the wireless device may use a length of one or more previous wake durations 365 (e.g., from a respective previous beacon interval 305) and respective wake intervals 360 to calculate an average (e.g., a moving average) wake duration utilization. In some cases, the average wake duration utilization may be different than the negotiated wake interval duration. For example, the AP 105 may configure an wake interval to be N time units (e.g., 10 ms), and the wireless device may determine the average wake duration utilization to be less than N time units (e.g., 7 ms). In such examples, the wireless device may wake (e.g., remain active) for the full wake interval 360 despite not communicating data for a portion of the wake interval 360, which may increase power consumption at the wireless device. After the averaging duration 375, the wireless device may deactivate for the remainder of the beacon interval 305 (e.g., while the AP 105 conducts one or more remaining wake intervals).

In some cases, the wireless device (e.g., STA 115 or other wireless devices) may modify a bit rate of a real-time stream (e.g., transmitted to a peripheral device) based on calculating the average wake duration utilization. The wireless device may adjust the bit rate of the real-time stream to support a consistent wake (e.g., ON) duration for communicating data packets. That is, the bit rate of the real-time stream may be associated with an wake duration (e.g., within a burst interval) for maintaining lossless streaming. For example, a real-time stream sampled at 96 kHz may support a bit rate of 2 Mbps, which may correspond to a data payload of 25

KB within a bust interval of 100 ms. In some cases, the wireless device may identify a modulation and coding scheme (MCS) level for the real-time stream, which may be associated with a condition of a wireless channel used for the real-time stream. The MCS level may correspond to a time that a receiving device takes to successfully receive a data payload satisfying lossless streaming (e.g., 25 KB). For example, a higher MCS level may support communications in a congested channel (e.g., a higher quantity of devices sending data in less time). Thus, by modifying the bit rate of the audio stream (and therefore the data payload of a burst interval), a wireless device may modify (e.g., reduce or extend) the wake duration of a peripheral device (e.g., a device receiving the real-time stream) while maintaining a same MCS level in accordance with the wireless channel.

To support consistent wake durations and battery life of the peripheral device, the wireless device may determine a target wake duration for transmissions of the real-time stream. In some examples, a wireless device may determine the target wake duration within an interval (e.g., the wake interval 360) based on a latency threshold for the real-time stream, a quality threshold for the real-time stream, a power budget for the wireless device, or any combination thereof. For example, the wireless device may determine a target wake duration which supports a high speed of communication (e.g., reduced latency), supports a lossless stream (e.g., improved quality), or both. Additionally, or alternatively, the wireless device may determine a target wake duration which supports relatively lower power consumption at the wireless device and at the peripheral device. In some examples, the target wake duration may correspond to a sampling rate of the real-time stream. For example, a 96 kHz sampling rate or a 48 kHz sampling rate may correspond to a first target wake duration (e.g., a 10 ms wake duration or an wake duration less than 10 ms), and a 192 kHz sampling rate may correspond to a second target wake duration (e.g., a 22 ms wake duration). In some cases, the second target wake duration may support lossless streaming at a high sampling rate in wireless channels with relatively low congestion (e.g., used by a small quantity of communicating devices).

In some examples, the wireless device may determine a difference between the average wake duration within an interval (e.g., the wake interval 360) and the target wake duration, and may modify the bit rate of the real-time stream according to the difference. For example, the wireless device may determine that the average wake duration is shorter than the target wake duration, and may increase the bit rate of the real-time stream (e.g., increasing the average wake duration). Alternatively, the wireless device may determine that the average wake duration is longer than the target wake duration (e.g., due to high channel congestion), and may decrease the bit rate of the real-time stream (e.g., decreasing the average wake duration). By adjusting the average wake duration (e.g., to be closer to the target wake duration), the wireless device and the peripheral device may consume less power while maintaining a high QoS of the real-time stream.

Figure 4:
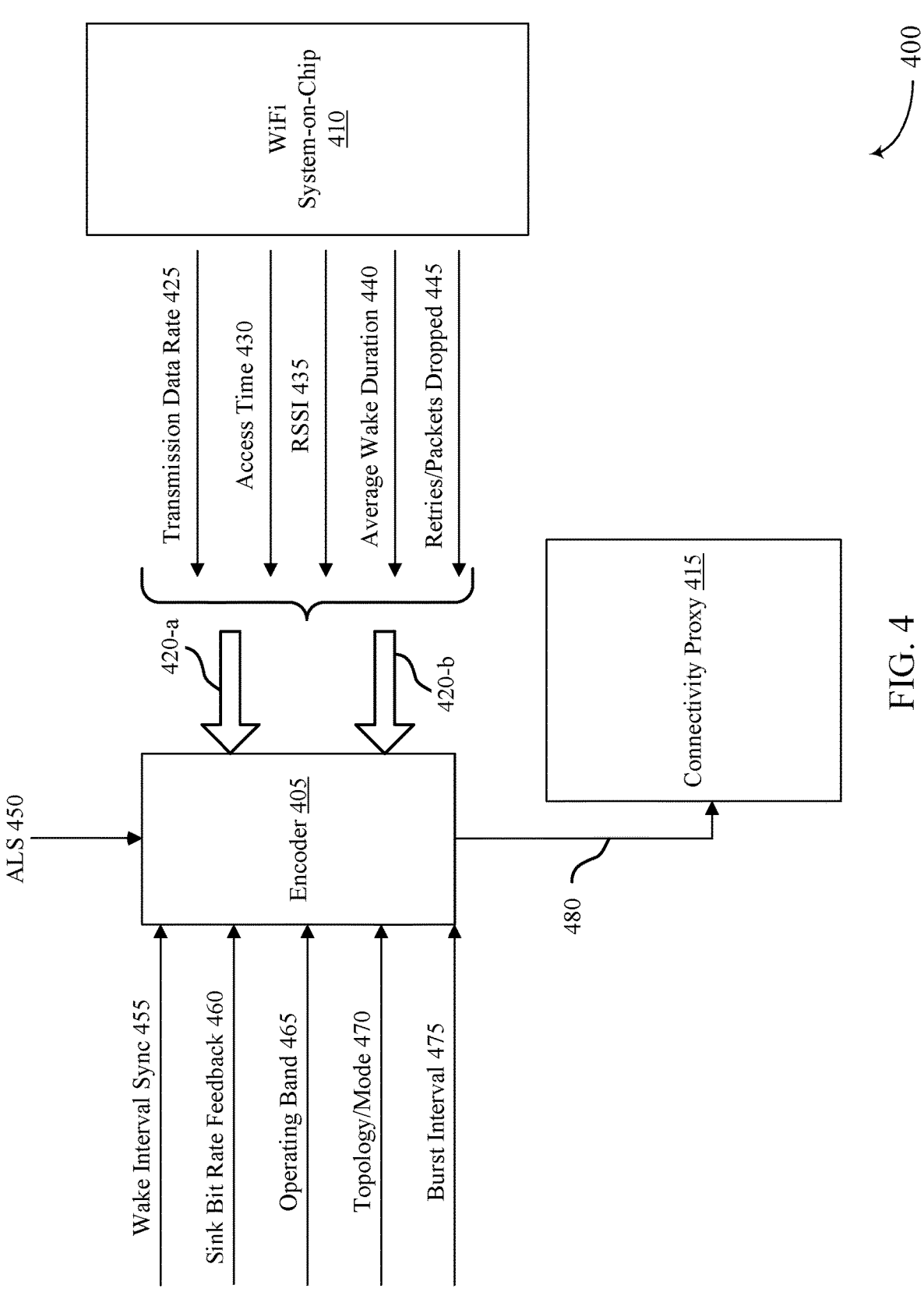
FIG. 4 illustrates an example of a system diagram that supports techniques for bitrate control in wireless communications in accordance with one or more aspects of the present disclosure.

FIG. 4 illustrates an example of a system diagram 400 that supports techniques for bitrate control in wireless communications in accordance with one or more aspects of the present disclosure. The system diagram 400 may be included in or implemented by a wireless device (e.g., STA 115 or other wireless devices) as described with reference to FIG. 3. For example, the system diagram 400 may include an encoder 405, a Wi-Fi system-on-chip (SoC) 410, and a connectivity proxy 415, each of which may be components of a wireless device (e.g., a STA 115) calculating an average wake duration, as described with reference to FIG. 3. In some examples, the encoder 405 may implement a codec for generating a bitrate for a real-time stream.

The components of the system diagram 400 may input data, output data, or both to support bitrate modification for a real-time stream at the wireless device, among other operations. For example, the encoder 405 implementing the codec, may receive, from the Wi-Fi SoC 410, a set of data 420-a for a first recipient device associated with the real-time stream and a set of data 420-b for a second recipient device associated with the real-time stream. In some cases, the sets of data 420 may indicate changes to the environment (e.g., a positional change between the wireless device and the recipient device) as perceived by the corresponding recipient device, such as a transmission data rate 425, an access time 430, a received signal strength indicator (RSSI) 435, an average wake duration 440, a quantity of retries to connect or a quantity of packets dropped 445, or any combination thereof. Additionally, or alternatively, the encoder 405 may receive one or more system parameters associated with a wireless link for the real-time stream, which may include an assistive listening system (ALS) 450, a wake interval window sync 455, a sink bit rate feedback 460, an operating band 465, a topology mode 470, a burst interval 475, or any combination thereof. In some examples, the encoder 405 may output, to the connectivity proxy 415, a data indication 480, which may include encoded data, adjusted data, and a quantity of audio frame samples.

In some examples, a wireless device associated with the system diagram 400 may modify a bit rate of a real-time stream in accordance with techniques described with reference to FIG. 3. That is, the wireless device may determine an average wake duration for the real time stream, and may modify the bit rate of the real-time stream according to a difference between the average wake duration and a target wake duration (e.g., to improve battery life, maintain a lossless stream, or both). In some cases, when determining the average wake duration, the wireless device may account for the average wake duration for one or more recipient devices associated with the real-time stream. For example, if the wireless device is transmitting the real-time stream to a set of audio earbuds, the encoder 405 may receive the data set 420-a associated with a left earbud (e.g., the first recipient device) and may receive the data set 420-b associated with a right earbud (e.g., the second recipient device). In some such examples, the data sets 420 may include parameters associated with a corresponding recipient device, which may support modification of the bit rate of the real-time stream. For example, the encoder 405 may receive a transmission data rate 425 for each recipient device, which may indicate a bit rate supported by the respective recipient device. Additionally, the encoder may receive an access time 430 (e.g., a latency percentile of 99% (P99)), an RSSI 435 (e.g., a quality of a wireless link between the wireless device and the recipient device), and a quantity of retries to connect or a quantity of packets dropped 445, each of which may indicate dynamic changes to the environment as perceived by the recipient device. In some examples, the encoder 405 may receive an average wake duration 440 for each respective recipient device, which may support precise bit rate modification over time. That is, the access time 430, the RSSI 435, and the quantity of retries to connect or the quantity of packets dropped 445 may support reactive (e.g., corrective) changes to the bit rate of the real-time stream (e.g., due to a change in the environment), while the average wake duration 440 may support longer-term optimization of the bit rate of the real-time stream (e.g., due to a larger quantity of samples for the average).

In some examples, the encoder 405 may modify the bit rate of the real-time stream based on one or more system parameters associated with a wireless link for the real-time stream. For example, the encoder 405 may receive ALS 450 data (e.g., to support output audio enhancements), a wake interval sync 455 (e.g., to align a wake duration with the wake interval scheduled by an AP 105), a sink bit rate feedback 460, an operating band 465 (e.g., a 5 GHz band or a 2.4 GHz band), a topology or mode 470 (e.g., a home network, a mesh home network, or the like), a burst interval 475 (e.g., a 100 ms burst interval), or any combination thereof. The encoder 405 may utilize one or more of the received parameters (e.g., the parameters associated with the wireless link, the parameters associated with the one or more recipient devices, or both) to determine a bit rate modification for the real-time stream, and may transmit a data indication 480 to the connectivity proxy 415. That is, the encoder 405 may indicate encoded data (e.g., according to the modified bit rate), adjusted data, and a quantity of samples for an audio frame to the connectivity proxy 415. In some examples, after receiving the data indication 480, the connectivity proxy 415 may compute the data relative to a timing synchronization function (TSF) for the wireless channel. The real-time stream may then be transmitted to the one or more recipient devices. In some examples, such as a mono type stream, the first recipient device and the second recipient device may receive data according to an offset. For example, the first recipient device may receive the real-time stream at a first time, and the second recipient device may receive the real-time stream at a second time that is offset from the first time by the target wake duration.

FIG. 5 illustrates an example of a timing diagram 500 that supports techniques for bitrate control in wireless communications in accordance with one or more aspects of the present disclosure. The timing diagram 500 may be implemented by aspects of the wireless communications systems 201 and 202 as described with reference to FIG. 2A and FIG. 2B, respectively. For example, the timing diagram 500 may be implemented by a wireless device (e.g., STA 115 or other wireless devices) communicating with a second wireless device (e.g., an AP 105 via a communication link 210) as described with reference to FIGS. 2A and 2B. In some examples, the timing diagram 500 may illustrate a wake duration 505, which may be an example of a duration over which the wireless device (and a peripheral device) is in an active state (e.g., to communicate data with the AP 105 and other wireless devices). In some examples, the wake duration 505 may be a 802.11ax TWT service period of a service interval or a wake duration of an interval in a power savings protocol. In some examples, the wake duration 505 may be configured to support a target battery life for a receiving device (e.g., the STA 115, a peripheral receiving device).

Within the wake duration 505, the wireless device may receive a burst 510-*a*, a burst 510-*b*, and a burst 510-*c*, which may each be examples of data packets sent within a short interframe space (SIFS) duration. That is, the AP 105 may partition data for the wireless device into one or more bursts due to regulatory or fair airtime constraints (e.g., established by a network, a government entity, or the like). For example, to support communications with multiple wireless devices (e.g., STAs 115 or other wireless devices), the AP 105 may communicate with the wireless device during the bursts 510, and may communicate with one or more different wireless devices during one or more contention periods 515 (e.g., intervals between data bursts). However, as a quantity of devices connected to an AP 105 (e.g., a home AP 105 or a set of APs 105 in a mesh network) increases, the airtime allocated for a data burst may be limited. For example, the AP 105 may transmit data bursts for a first duration in a clean channel (e.g., 10 ms bursts) and may transmit data bursts for a second duration in a congested channel (e.g., less than 10 ms bursts). Accordingly, the bit rate of the data bursts may be modified in order to successfully communicate data, in one or more data bursts, within the wake duration 505 (e.g., to maintain the target battery life).

Additionally, or alternatively, the wireless device may determine a scheduling pattern of the AP 105 to support modifying (e.g., reducing) the wake duration 505. That is, the wireless device may use one or more prior wake durations 505 to model the pattern of the bursts 510 and the contention periods 515, and may identify one or more underutilized bursts 510 (e.g., a burst 510 with relatively less data towards the end of the wake duration 505) using the pattern. For example, the wireless device may determine that the last burst 510-*c* includes less data than the previous data bursts 510 (e.g., the burst 510-*a* and the burst 510-*b*) based on the scheduling pattern of the AP 105. In some examples, the wireless device may reduce the codec bitrate for receiving data to reduce a length of the wake duration 505 based on determining the underutilized burst 510-*c*. For example, the wireless device may reduce a codec bitrate such that the data fits within the burst 510-*a* and 510-*b* (e.g., receiving the data without receiving the burst 510-*c*), which may support power savings while maintaining a similar audio quality.

In some examples, to determine the scheduling pattern of the AP 105, the wireless device may calculate one or more metrics associated with the wake duration 505. For example, the wireless device may use one or more prior wake durations 505 to calculate a first average corresponding to a length of each burst 510 excluding the last burst (e.g., the average length of the burst 510-*a* and the burst 510-*b*) and may calculate a second average corresponding to a length of the last burst 510 (e.g., the average length of the burst 510-*c*). In some such examples, the wireless device may calculate a third average corresponding to the contention periods 515 (e.g., inter burst delays due to contentions and the AP 105 scheduling). By determining the first average, the second average, the third average, or any combination thereof, the wireless device may model the scheduling pattern and determine whether to receive the last burst 510 or to terminate the wake duration 505 prior to receiving the burst 510-*c*. That is, the wireless device may compare the average length of the last burst 510-*c* to the average length of the remaining bursts 510, and may reduce to codec bitrate to eliminate the last burst 510-*c* in the wake duration 505 upon determining that the average length of the last burst 510-*c* is shorter than the average length of the remaining bursts 510. Additionally, or alternatively, the wireless device may identify a first power usage value associated with receiving each of the bursts 510 and may identify a second power usage value associated with refraining from receiving the last burst 510-*c* of the wake duration. The wireless device may determine whether to reduce the wake duration 505 early based on a difference between the first power usage value and the second power usage value and a comparison of the difference with the target battery life of the wireless device or the peripheral device. In some other examples, the wireless device may identify a threshold loss of quality for the real-time stream, and may determine whether to refrain from receiving the last burst 510-*c* based on comparing the threshold to a loss of quality associated with refraining from receiving the last burst 510-*c*. In another embodiment, the wireless device may determine whether to reduce the codec bitrate to reduce the wake duration 505 based on a maximum size of the bursts 510.

In some examples, such as the wireless communications system 201 illustrated by FIG. 2A, a calculated average burst length (e.g., an average of the burst 510-*a*, the burst 510-*b*, and the burst 510-*c*), may be communicated to an encoder of the STA 115-*a* (e.g., via the communication link 215). That is, the average calculation may be performed by the peripheral device 205, and subsequently communicated to the encoder of the STA 115-*a*. In some cases, the peripheral device 205 may also communicate a desired codec bitrate to the STA 115-*a*, which may be based on the average burst length.

Figure 6:
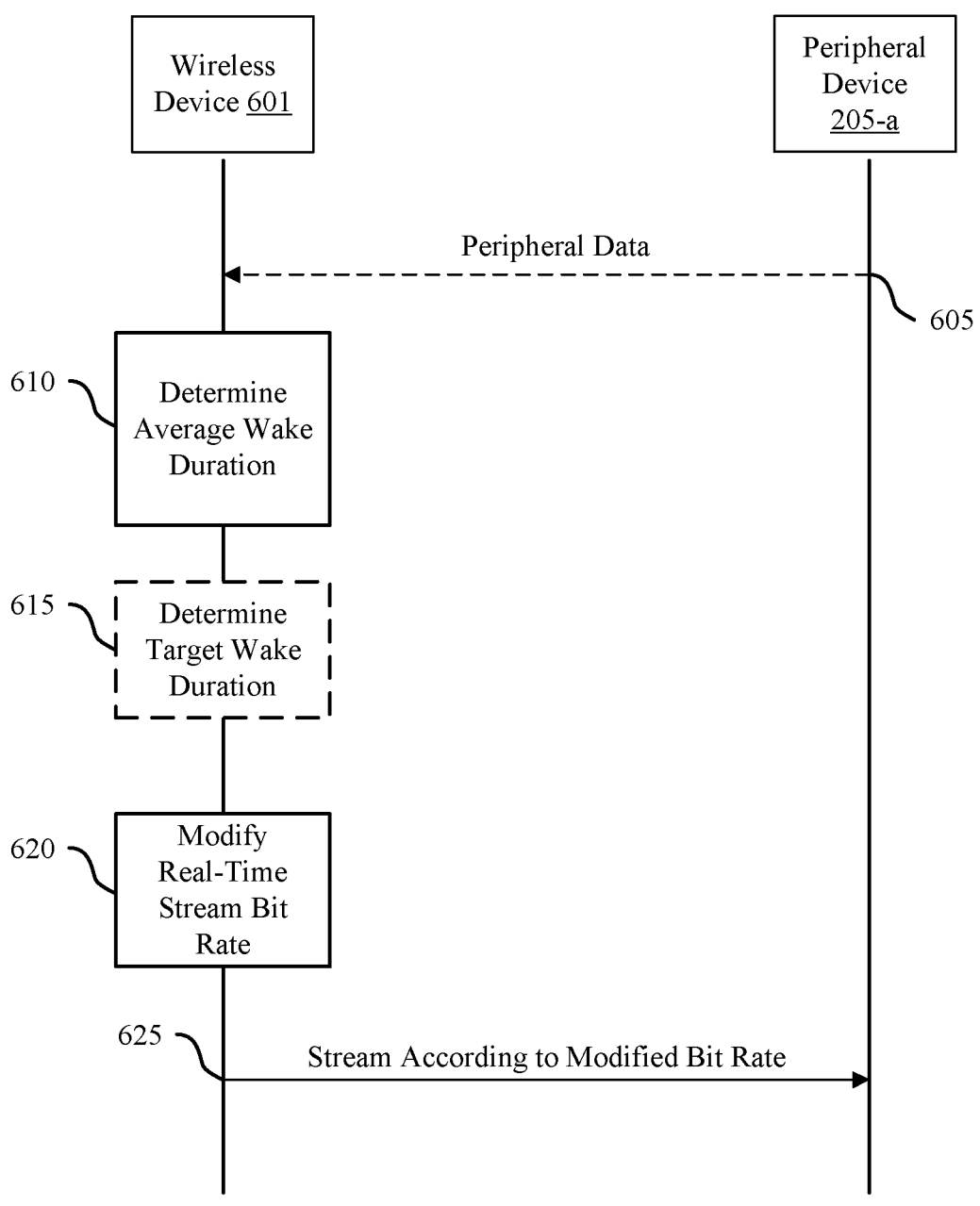
FIG. 6 illustrates an example of a process flow that supports techniques for bitrate control in wireless communications in accordance with one or more aspects of the present disclosure.

FIG. 6 illustrates an example of a process flow 600 that supports techniques for bitrate control in wireless communications in accordance with one or more aspects of the present disclosure. In some examples, the process flow 600 may implement aspects of the wireless communications system 100 and the wireless communications systems 201 and 202. Additionally, the process flow 600 may illustrate an example of a wireless device 601 (e.g., STA 115 or other wireless devices) modifying a bit rate of a real-time stream in accordance with techniques described with reference to FIG. 3 and FIG. 4. For example, the process flow 600 may illustrate the wireless device 601 modifying the bit rate of the real-time stream transmitted to a peripheral device 205-*a* to support a wake duration of the peripheral device 205-*a* according to a target wake duration (e.g., corresponding to power savings). Alternative examples of the following may be implemented, where some processes are performed in a different order than described or are not performed. In some cases, processes may include additional features not mentioned below, or further processes may be added.

At 605, the peripheral device 205-*a* may optionally transmit, to the wireless device 601, one or more parameters associated with the peripheral device 205-*a*. For example, the peripheral device 205-*a* may transmit a supported bit rate, an access time, a received signal strength indicator, an average wake duration, a quantity of attempts to re-establish connection with the wireless device, a quantity of packets dropped, or any combination thereof for the peripheral device 205-*a*. In some examples, such as when the peripheral device 205-*a* is an example of a set of earbuds, the peripheral device 205-*a* may transmit a first set of parameters corresponding to a first receiving component (e.g., a left earbud) and may transmit a second set of parameters corresponding to a second receiving component (e.g., a right earbud).

At 610, the wireless device 601 may determine an average wake duration for a real-time stream, which may be an example of an audio stream, a video stream, a phone call, haptic feedback, or the like. In some cases, the wireless device 601 may use the one or more parameters associated with the peripheral device 205-*a*, one or more prior wake durations, or both to determine the average wake duration. For example, the wireless device 601 may calculate a moving average of a quantity of previous wake durations to determine the average wake durations. In some cases, the wireless device 601 may further determine the average wake duration using the average duration indicated by the peripheral device 205-*a*.

At 615, the wireless device 601 may determine a target wake duration for the real-time stream. In some examples, the target wake duration may be associated with a congestion level of a channel for the real-time stream, a latency threshold for the real-time stream, a quality threshold for the real-time stream, a power budget for the wireless device 601 and the peripheral device 205-*a*, or any combination thereof. Additionally, or alternatively, the target wake duration may represent a negotiated or scheduled duration of an active interval corresponding to the wireless device 601.

At 620, the wireless device 601 may modify the bit rate of the real-time stream based on comparing the average wake duration and the target wake duration. For example, the wireless device 601 may determine that the average wake duration (e.g., average actual wake duration or average utilized wake duration) is shorter than the target wake duration, and may increase the bit rate of the real-time stream in order to increase the average wake duration (e.g., to be closer to the target wake duration). In some other examples, the wireless device 601 may determine that the average wake duration is longer than the target wake duration, and may decrease the bit rate of the real-time stream in order to increase the average wake duration.

At 625, the wireless device 601 may transmit the real-time stream to the peripheral device 205-*a* in accordance with the modified bit rate, which may support power savings at the peripheral device 205-*a* while maintaining a high QoS of the real-time stream.

Figure 7:
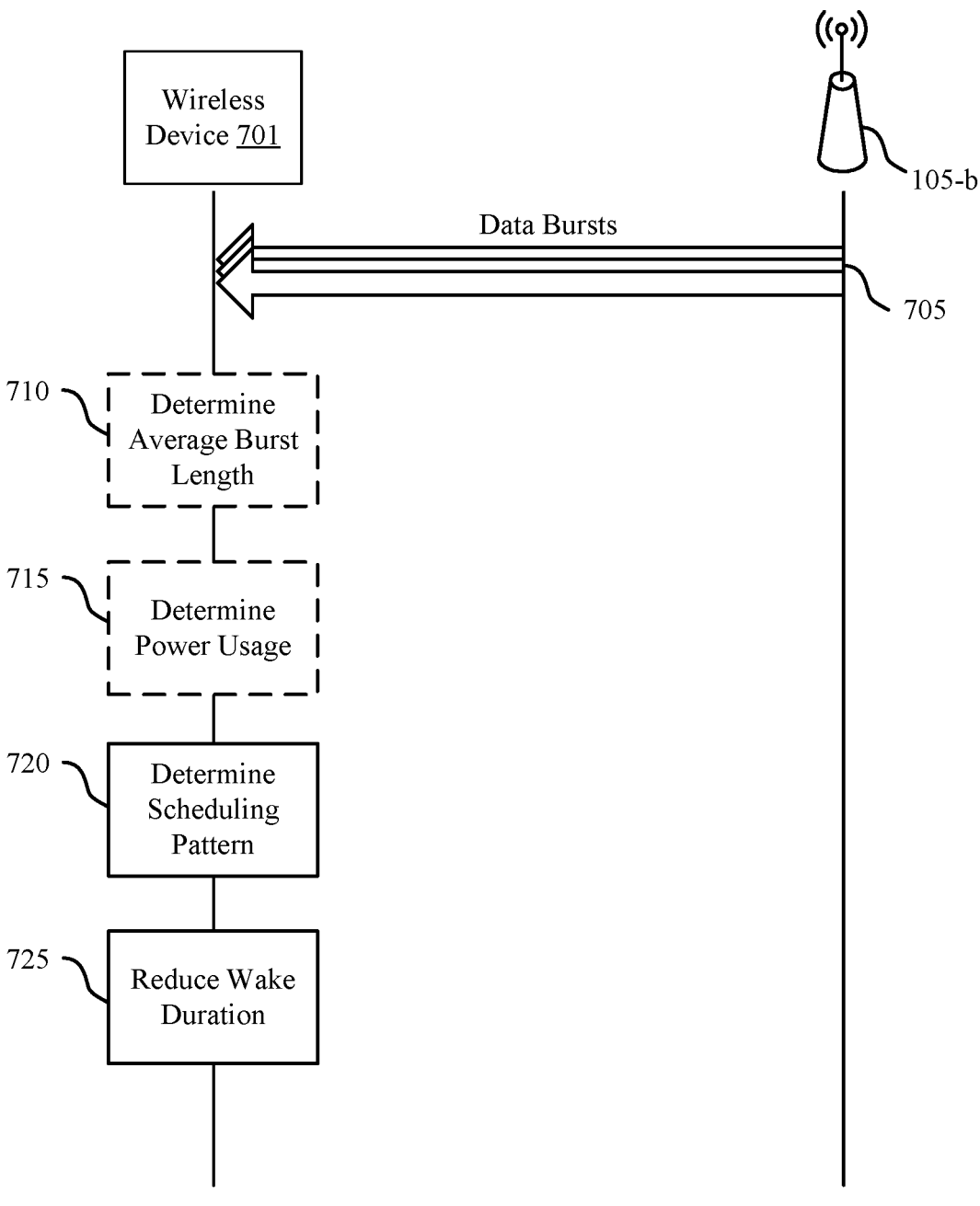
FIG. 7 illustrates an example of a process flow that supports techniques for bitrate control in wireless communications in accordance with one or more aspects of the present disclosure.

FIG. 7 illustrates an example of a process flow 700 that supports techniques for bitrate control in wireless communications in accordance with one or more aspects of the present disclosure. In some examples, the process flow 700 may implement aspects of the wireless communications system 100 and the wireless communications systems 201 and 202. Additionally, the process flow 700 may illustrate an example of a wireless device 701 (e.g., STA 115 or other wireless devices) reducing a wake duration according to a scheduling pattern of an AP 105-*b*. For example, the process flow 700 may illustrate the wireless device 701 determining one or more metrics of data bursts within the wake duration to determine the scheduling pattern, which may support early termination of the wake duration. Alternative examples of the following may be implemented, where some processes are performed in a different order than described or are not performed. In some cases, processes may include additional features not mentioned below, or further processes may be added.

At 705, the AP 105-*b* may transmit, to the wireless device 701, multiple sets of data bursts corresponding to respective wake durations. That is, the wireless device 701 may receive a set of data bursts (e.g., each including multiple data packets) over each wake duration of an interval (e.g., 100 ms), and may receive data over multiple wake durations and respective intervals.

At 710, the wireless device 701 may determine one or more averages associated with the data bursts. For example, the wireless device 701 may determine a first average length corresponding to the data bursts excluding the last data burst of each wake duration, and may determine a second average length corresponding to the last data burst. Additionally, or alternatively, the wireless device 701 may determine a third average length corresponding to inter-burst delays (e.g., periods of time where the AP 105-*b* is communicating with other wireless devices). The wireless device 701 may use the one or more averages to determine whether to receive the last burst of the wake duration. For example, the wireless device 701 may determine that the last burst of the wake duration has a substantially lower length than the remaining bursts of the wake duration, and may reduce the codec bitrate such that the data fits within the remaining bursts of the wake duration (e.g., refrain from receiving the last burst) based on the determination.

At 715, the wireless device 701 may optionally determine a power usage value associated with receiving each burst in the wake duration and a power usage value associated with refraining from receiving the last burst of the wake duration. For example, the wireless device 701 may determine that not receiving the last burst of the wake duration consumes substantially less power than receiving each burst of the wake duration, and may modify a codec bit rate for the real time stream (e.g., to refrain from receiving the last burst based on the determination).

At 720, the wireless device 701 may determine a scheduling pattern of the AP 105-*b*. That is, the wireless device 701 may use the one or more averages associated with data bursts of the wake duration in order to model the scheduling pattern of the AP 105-*b*. In some cases, the wireless device 701 may identify a threshold loss of quality of the real-time stream, and may compare the threshold loss of quality to a loss of quality associated with refraining from receiving the last burst of the wake duration. For example, the wireless device 701 may determine to refrain from receiving the last burst of the wake duration based on the loss of quality associated with refraining from receiving the last burst of the wake duration being less than the threshold loss of quality.

At 725, the wireless device 701 may reduce a bit rate of the real time stream to reduce a wake duration of the wireless device 701 (and an associated peripheral device) prior to an end of the wake duration. For example, the wireless device 701 may determine to refrain from receiving the last burst of the wake duration, and may instead reduce the codec bitrate to fit the data (from the underutilized burst) in the penultimate burst of the wake duration. By reducing the wake duration, the wireless device 701 may consume less power while maintaining a relatively high QoS of the real-time stream.

Figure 8:
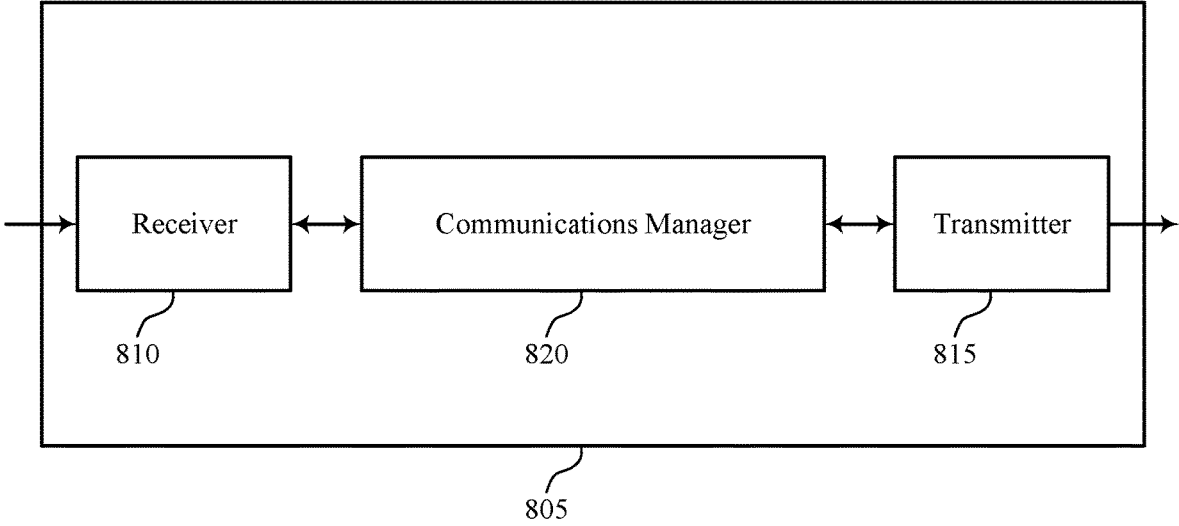
FIGS. 8 and 9 show block diagrams of devices that support techniques for bitrate control in wireless communications in accordance with one or more aspects of the present disclosure.

FIG. 8 shows a block diagram 800 of a device 805 that supports techniques for bitrate control in wireless communications in accordance with one or more aspects of the present disclosure. The device 805 may be an example of aspects of a STA as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for bitrate control in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for bitrate control in wireless communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for bitrate control in wireless communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 may be configured as or otherwise support a means for determining an average wake duration of a wireless device based on one or more average wake durations of the wireless device over one or more previous time windows. The communications manager 820 may be configured as or otherwise support a means for modifying a bit rate of a real-time stream at the wireless device based on the average wake duration and a threshold time period. The communications manager 820 may be configured as or otherwise support a means for transmitting the real-time stream in accordance with the modified bit rate.

Additionally, or alternatively, the communications manager 820 may support wireless communication at a first wireless device in accordance with examples as disclosed herein. For example, the communications manager 820 may be configured as or otherwise support a means for receiving, from a second wireless device, a set of multiple data bursts in a wake duration and in accordance with a scheduling pattern, where each data burst of the set of multiple data bursts includes a set of data packets. The communications manager 820 may be configured as or otherwise support a means for determining the scheduling pattern of the second wireless device based on receiving the set of multiple data bursts. The communications manager 820 may be configured as or otherwise support a means for reducing the wake duration of the first wireless device based on modifying a bit rate of the first wireless device and the scheduling pattern of the second wireless device.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption at a STA 115 and a peripheral device, thereby enhancing battery life while maintaining a relatively high QoS for a real-time stream, which may improve user experience.

Figure 9:
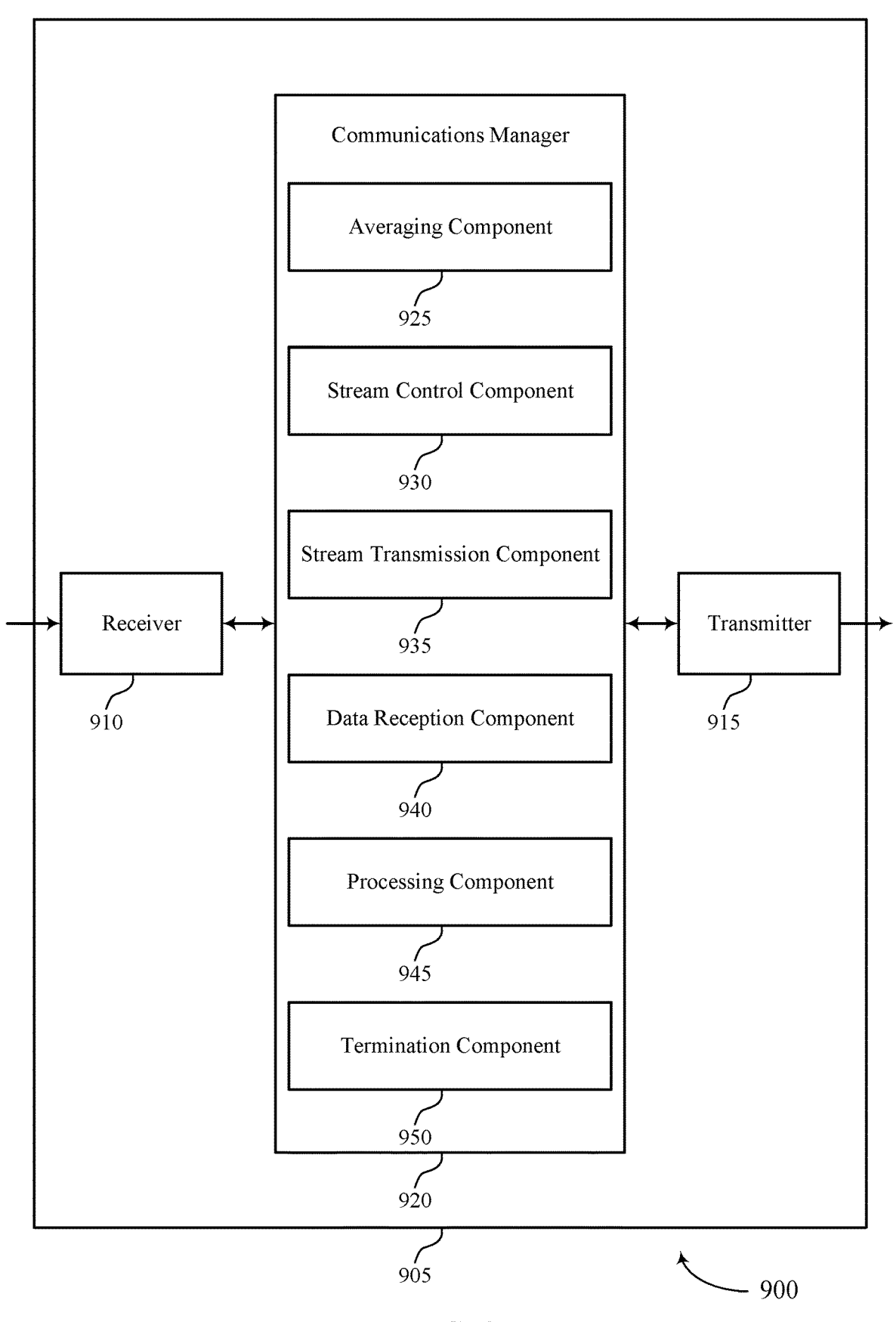

FIG. 9 shows a block diagram 900 of a device 905 that supports techniques for bitrate control in wireless communications in accordance with one or more aspects of the present disclosure. The device 905 may be an example of aspects of a device 805 or a STA 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for bitrate control in wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for bitrate control in wireless communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for bitrate control in wireless communications as described herein. For example, the communications manager 920 may include an averaging component 925, a stream control component 930, a stream transmission component 935, a data reception component 940, a processing component 945, a termination component 950, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The averaging component 925 may be configured as or otherwise support a means for determining an average wake duration of a wireless device based on one or more wake durations of the wireless device over one or more previous time windows. The stream control component 930 may be configured as or otherwise support a means for modifying a bit rate of a real-time stream at the wireless device based on the average wake duration and a threshold time period. The stream transmission component 935 may be configured as or otherwise support a means for transmitting the real-time stream in accordance with the modified bit rate.

Additionally, or alternatively, the communications manager 920 may support wireless communication at a first wireless device in accordance with examples as disclosed herein. The data reception component 940 may be configured as or otherwise support a means for receiving, from a second wireless device, a set of multiple data bursts in a wake duration and in accordance with a scheduling pattern, where each data burst of the set of multiple data bursts includes a set of data packets. The processing component 945 may be configured as or otherwise support a means for determining the scheduling pattern of the second wireless device based on receiving the set of multiple data bursts. The termination component 950 may be configured as or otherwise support a means for reducing the wake duration of the first wireless device based on modifying a bit rate of the first wireless device and the scheduling pattern of the second wireless device.

Figure 10:
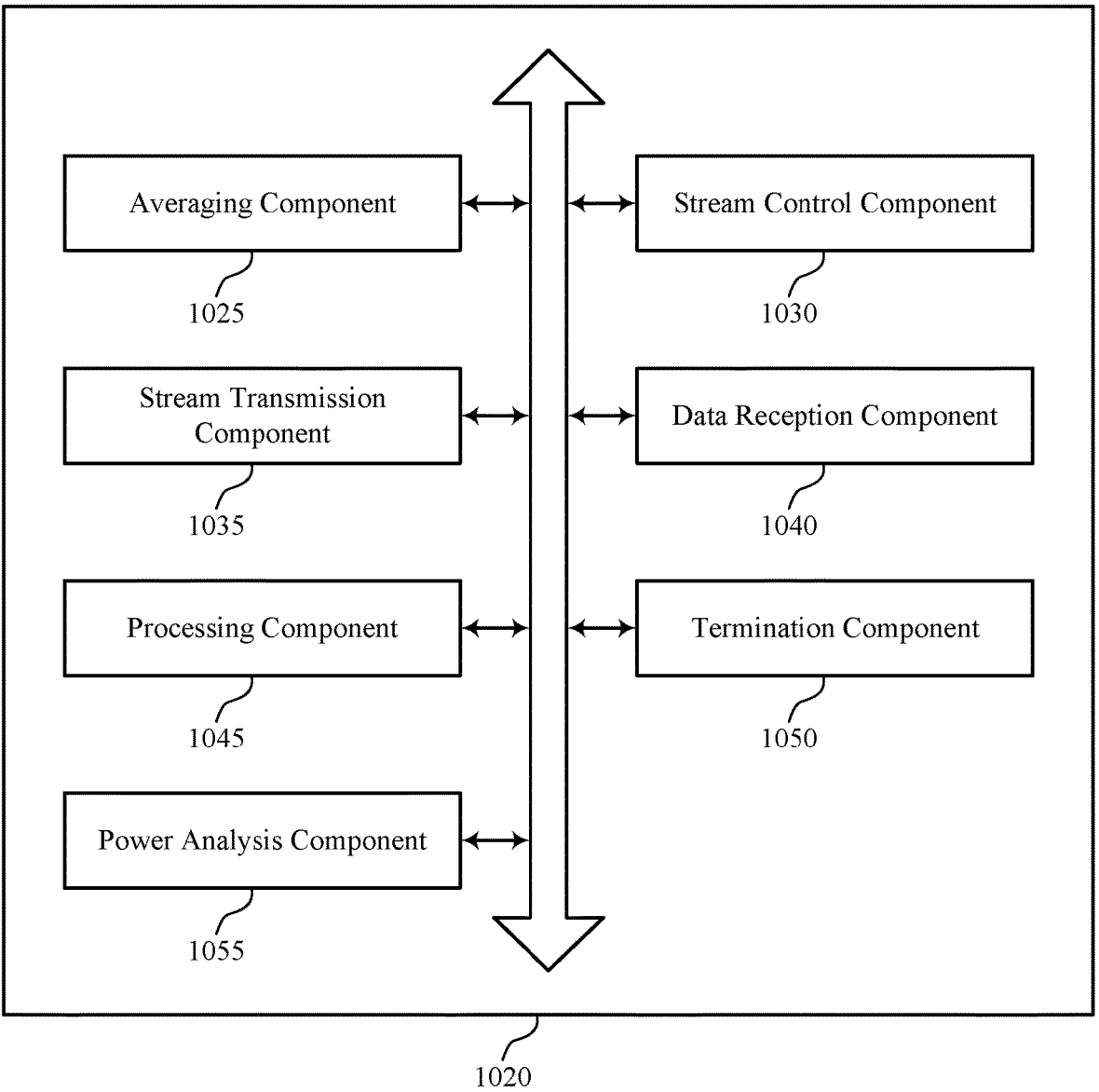
FIG. 10 shows a block diagram of a communications manager that supports techniques for bitrate control in wireless communications in accordance with one or more aspects of the present disclosure.

FIG. 10 shows a block diagram 1000 of a communications manager 1020 that supports techniques for bitrate control in wireless communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for bitrate control in wireless communications as described herein. For example, the communications manager 1020 may include an averaging component 1025, a stream control component 1030, a stream transmission component 1035, a data reception component 1040, a processing component 1045, a termination component 1050, a power analysis component 1055, or any combination thereof. Each of these components may communicate, directly or indirectly, with one another (e.g., via one or more buses).

The communications manager 1020 may support wireless communication in accordance with examples as disclosed herein. The averaging component 1025 may be configured as or otherwise support a means for determining an average wake duration of a wireless device based on one or more wake durations of the wireless device over one or more previous time windows. The stream control component 1030 may be configured as or otherwise support a means for modifying a bit rate of a real-time stream at the wireless device based on the average wake duration and a threshold time period. The stream transmission component 1035 may be configured as or otherwise support a means for transmitting the real-time stream in accordance with the modified bit rate.

In some examples, the processing component 1045 may be configured as or otherwise support a means for determining a target active duration for the real-time stream. In some examples, the processing component 1045 may be configured as or otherwise support a means for comparing the average wake duration to the target active duration, where modifying the bit rate of the real-time stream is based on the comparing.

In some examples, the processing component 1045 may be configured as or otherwise support a means for determining that the average wake duration is shorter than the target active duration, where modifying the bit rate of the real-time stream includes increasing the bit rate of the real-time stream.

In some examples, the processing component 1045 may be configured as or otherwise support a means for determining that the average wake duration is longer than the target active duration, where modifying the bit rate of the real-time stream includes decreasing the bit rate of the real-time stream.

In some examples, the target active duration is based on a latency threshold for the real-time stream, a quality threshold for the real-time stream, a power budget for the wireless device, or any combination thereof. In some examples, modifying the bit rate of the real-time stream is based on a congestion level of a channel associated with the real-time stream. In some examples, to support determining the average wake duration, the averaging component 1025 may be configured as or otherwise support a means for determining a moving average of a quantity of the one or more wake durations.

In some examples, to support determining the average wake duration, the averaging component 1025 may be configured as or otherwise support a means for determining an average wake duration for a first recipient device associated with the real-time stream. In some examples, to support determining the average wake duration, the averaging component 1025 may be configured as or otherwise support a means for determining an average wake duration for a second recipient device associated with the real-time stream.

In some examples, the data reception component 1040 may be configured as or otherwise support a means for inputting one or more parameters associated with the first recipient device to an encoder associated with the wireless device. In some examples, the data reception component 1040 may be configured as or otherwise support a means for inputting one or more parameters associated with the second recipient device to the encoder associated with the wireless device, where modifying the bit rate of the real-time stream is based on inputting the one or more parameters associated with the first recipient device and the one or more parameters associated with the second recipient device to the encoder. In some examples, the data reception component 1040 may be configured as or otherwise support a means for receiving, from at least one peripheral device, an indication of a modified bit rate of the first wireless device, where the modified bit rate is based at least in part on the plurality of data bursts, and where reducing the wake duration of the first wireless device is based at least in part on receiving the indication of the modified bit rate.

In some examples, the one or more parameters includes a supported bit rate, an access time, a received signal strength indicator, the average wake duration, a quantity of attempts to re-establish connection with the wireless device, a quantity of packets dropped, or any combination thereof.

In some examples, the processing component 1045 may be configured as or otherwise support a means for determining a start time of a wake duration for the second recipient device, where the start time is offset by the target active duration.

In some examples, the first recipient device includes a left earbud and the second recipient device includes a right earbud. In some examples, the wireless device is connected to a home access point in a home network or a set of access points in a mesh home network. In some examples, the real-time stream includes at least one of an audio stream, a video stream, a phone call, haptic feedback, or any combination thereof.

Additionally, or alternatively, the communications manager 1020 may support wireless communication at a first wireless device in accordance with examples as disclosed herein. The data reception component 1040 may be configured as or otherwise support a means for receiving, from a second wireless device, a set of multiple data bursts in an wake duration and in accordance with a scheduling pattern, where each data burst of the set of multiple data bursts includes a set of data packets. The processing component 1045 may be configured as or otherwise support a means for determining the scheduling pattern of the second wireless device based on receiving the set of multiple data bursts. The termination component 1050 may be configured as or otherwise support a means for reducing the wake duration of the first wireless device based on modifying a bit rate of the first wireless device and the scheduling pattern of the second wireless device.

In some examples, the averaging component 1025 may be configured as or otherwise support a means for determining an average burst length of the set of multiple data bursts in the wake duration, where determining the scheduling pattern is based on determining the average burst length.

In some examples, the power analysis component 1055 may be configured as or otherwise support a means for determining a first power usage value associated with receiving each data burst of the set of multiple data bursts. In some examples, the power analysis component 1055 may be configured as or otherwise support a means for determining a second power usage value associated with refraining from receiving a last data burst of the set of multiple data bursts, where reducing the wake duration of the first wireless device based on modifying a bit rate of the first wireless device and the scheduling pattern of the second wireless device.

In some examples, the processing component 1045 may be configured as or otherwise support a means for excluding a last data burst of the set of multiple data bursts in the wake duration based on the scheduling pattern, where determining the average burst length of the set of multiple data bursts includes determining an average burst length of a remaining quantity of data bursts of the set of multiple data bursts in the wake duration.

In some examples, the termination component 1050 may be configured as or otherwise support a means for determining an average burst length of a last data burst of a set of multiple previous wake durations, where excluding the last data burst of the set of multiple data bursts in the wake duration is based on the average burst length.

In some examples, reducing the active duration of the first wireless device prior to the end of the wake duration is based on the average burst length of the last burst being shorter than the average burst length of the remaining quantity of data bursts. In some examples, reducing the active duration of the first wireless device prior to the end of the wake duration is based on a threshold loss of quality for the first wireless device. In some examples, the processing component 1045 may be configured as or otherwise support a means for determining a maximum burst size, where reducing the wake duration of the first wireless device prior to the end of the wake duration is based on the maximum burst size.

Figure 11:
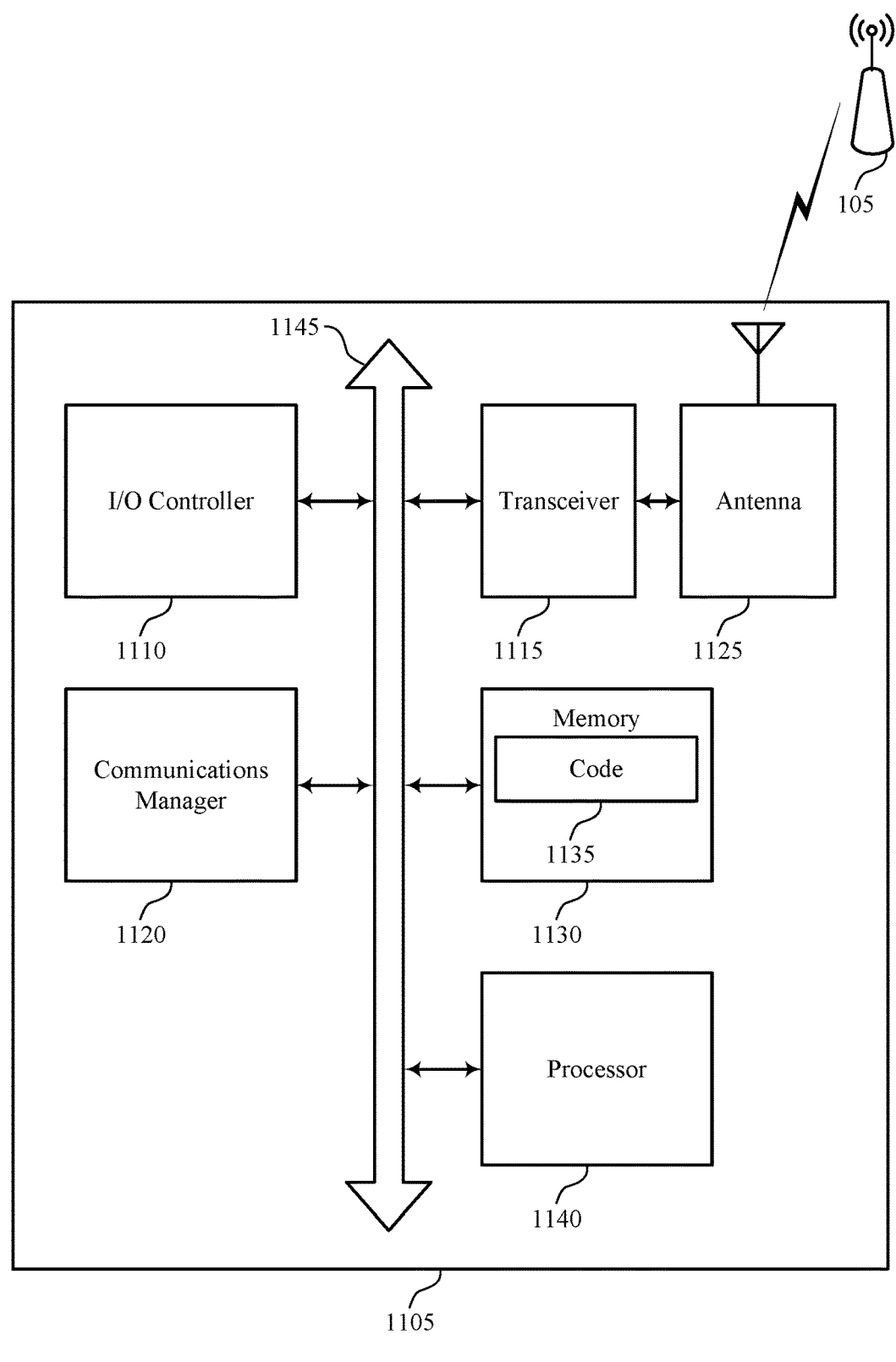
FIG. 11 shows a diagram of a system including a device that supports techniques for bitrate control in wireless communications in accordance with one or more aspects of the present disclosure.

FIG. 11 shows a diagram of a system 1100 including a device 1105 that supports techniques for bitrate control in wireless communications in accordance with one or more aspects of the present disclosure. The device 1105 may be an example of or include the components of a device 805, a device 905, or a STA as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In some other cases, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets and provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for bitrate control in wireless communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication in accordance with examples as disclosed herein. For example, the communications manager 1120 may be configured as or otherwise support a means for determining an average wake duration of a wireless device based on one or more wake durations of the wireless device over one or more previous time windows. The communications manager 1120 may be configured as or otherwise support a means for modifying a bit rate of a real-time stream at the wireless device based on the average wake duration and a threshold time period. The communications manager 1120 may be configured as or otherwise support a means for transmitting the real-time stream in accordance with the modified bit rate.

Additionally, or alternatively, the communications manager 1120 may support wireless communication at a first wireless device in accordance with examples as disclosed herein. For example, the communications manager 1120 may be configured as or otherwise support a means for receiving, from a second wireless device, a set of multiple data bursts in a wake duration and in accordance with a scheduling pattern, where each data burst of the set of multiple data bursts includes a set of data packets. The communications manager 1120 may be configured as or otherwise support a means for determining the scheduling pattern of the second wireless device based on receiving the set of multiple data bursts. The communications manager 1120 may be configured as or otherwise support a means for reducing the wake duration of the first wireless device based on modifying a bit rate of the first wireless device and the scheduling pattern of the second wireless device.

By including or configuring the communications manager 1120 in accordance with examples as described herein, the device 1105 may support techniques for reduced power consumption at a STA 115 and a peripheral device, thereby extending battery life while maintaining a relatively high QoS for a real-time stream, which may improve user experience.

Figure 12:
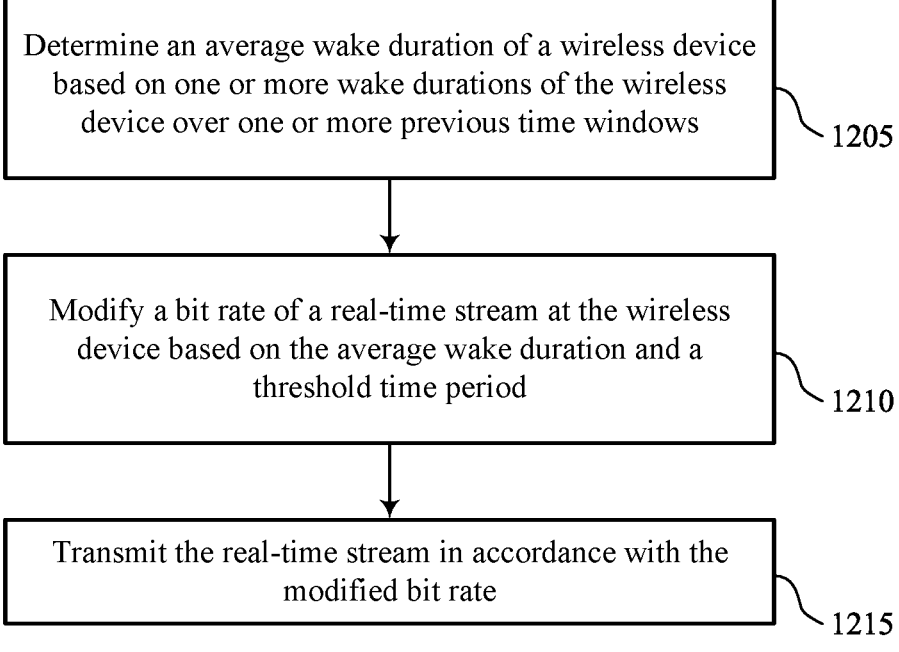

FIG. 12 shows a flowchart illustrating a method 1200 that supports techniques for bitrate control in wireless communications in accordance with one or more aspects of the present disclosure. The operations of the method 1200 may be implemented by a STA or its components as described herein. For example, the operations of the method 1200 may be performed by a STA as described with reference to FIGS. FIG. 1 through 11. In some examples, a STA may execute a set of instructions to control the functional elements of the STA to perform the described functions. Additionally, or alternatively, the STA may perform aspects of the described functions using special-purpose hardware.

At 1205, the method may include determining an average wake duration of a wireless device based on one or more wake durations of the wireless device over one or more previous time windows. The operations of 1205 may be performed in accordance with examples as disclosed herein.

In some examples, aspects of the operations of 1205 may be performed by an averaging component 1025 as described with reference to FIG. 10.

At 1210, the method may include modifying a bit rate of a real-time stream at the wireless device based on the average wake duration and a threshold time period. The operations of 1210 may be performed in accordance with examples as disclosed herein. In some examples, aspects of the operations of 1210 may be performed by a stream control component 1030 as described with reference to FIG. 10.

At 1215, the method may include transmitting the real-time stream in accordance with the modified bit rate. The operations of 1215 may be performed in accordance with examples as disclosed herein. In some examples, aspects of the operations of 1215 may be performed by a stream transmission component 1035 as described with reference to FIG. 10.

Figure 13:
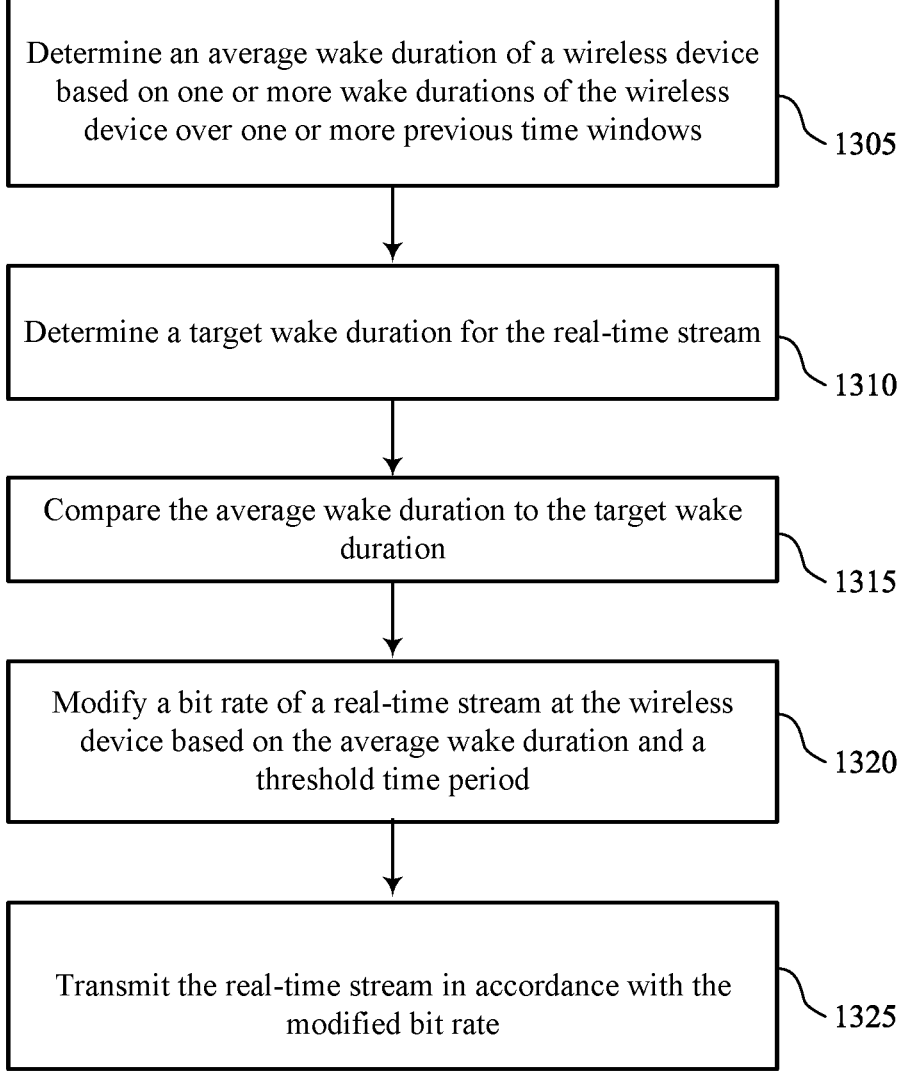

FIG. 13 shows a flowchart illustrating a method 1300 that supports techniques for bitrate control in wireless communications in accordance with one or more aspects of the present disclosure. The operations of the method 1300 may be implemented by a STA or its components as described herein. For example, the operations of the method 1300 may be performed by a STA as described with reference to FIGS. 1 through 11. In some examples, a STA may execute a set of instructions to control the functional elements of the STA to perform the described functions. Additionally, or alternatively, the STA may perform aspects of the described functions using special-purpose hardware.

At 1305, the method may include determining an average wake duration of a wireless device based on one or more wake durations of the wireless device over one or more previous time windows. The operations of 1305 may be performed in accordance with examples as disclosed herein. In some examples, aspects of the operations of 1305 may be performed by an averaging component 1025 as described with reference to FIG. 10.

At 1310, the method may include determining a target active duration for the real-time stream. The operations of 1310 may be performed in accordance with examples as disclosed herein. In some examples, aspects of the operations of 1310 may be performed by a processing component 1045 as described with reference to FIG. 10.

At 1315, the method may include comparing the average wake duration to the target active duration. The operations of 1315 may be performed in accordance with examples as disclosed herein. In some examples, aspects of the operations of 1315 may be performed by a processing component 1045 as described with reference to FIG. 10.

At 1320, the method may include modifying a bit rate of a real-time stream at the wireless device based on the average wake duration and a threshold time period. In some examples, modifying the bit rate of the real-time stream is based on the comparing. The operations of 1320 may be performed in accordance with examples as disclosed herein. In some examples, aspects of the operations of 1320 may be performed by a stream control component 1030 as described with reference to FIG. 10.

At 1325, the method may include transmitting the real-time stream in accordance with the modified bit rate. The operations of 1325 may be performed in accordance with examples as disclosed herein. In some examples, aspects of the operations of 1325 may be performed by a stream transmission component 1035 as described with reference to FIG. 10.

FIG. 14 shows a flowchart illustrating a method 1400 that supports techniques for bitrate control in wireless communications in accordance with one or more aspects of the present disclosure. The operations of the method 1400 may be implemented by a STA or its components as described herein. For example, the operations of the method 1400 may be performed by a STA as described with reference to FIGS. 1 through 11. In some examples, a STA may execute a set of instructions to control the functional elements of the STA to perform the described functions. Additionally, or alternatively, the STA may perform aspects of the described functions using special-purpose hardware.

At 1405, the method may include receiving, from a second wireless device, a set of multiple data bursts in a wake duration and in accordance with a scheduling pattern, where each data burst of the set of multiple data bursts includes a set of data packets. The operations of 1405 may be performed in accordance with examples as disclosed herein. In some examples, aspects of the operations of 1405 may be performed by a data reception component 1040 as described with reference to FIG. 10.

At 1410, the method may include determining the scheduling pattern of the second wireless device based on receiving the set of multiple data bursts. The operations of 1410 may be performed in accordance with examples as disclosed herein. In some examples, aspects of the operations of 1410 may be performed by a processing component 1045 as described with reference to FIG. 10.

At 1415, the method may include reducing the wake duration of the first wireless device based on modifying a bit rate of the first wireless device and the scheduling pattern of the second wireless device. The operations of 1415 may be performed in accordance with examples as disclosed herein. In some examples, aspects of the operations of 1415 may be performed by a termination component 1050 as described with reference to FIG. 10.

FIG. 15 shows a flowchart illustrating a method 1500 that supports techniques for bitrate control in wireless communications in accordance with one or more aspects of the present disclosure. The operations of the method 1500 may be implemented by a STA or its components as described herein. For example, the operations of the method 1500 may be performed by a STA as described with reference to FIGS. 1 through 11. In some examples, a STA may execute a set of instructions to control the functional elements of the STA to perform the described functions. Additionally, or alternatively, the STA may perform aspects of the described functions using special-purpose hardware.

At 1505, the method may include receiving, from a second wireless device, a set of multiple data bursts in a wake duration and in accordance with a scheduling pattern, where each data burst of the set of multiple data bursts includes a set of data packets. The operations of 1505 may be performed in accordance with examples as disclosed herein. In some examples, aspects of the operations of 1505 may be performed by a data reception component 1040 as described with reference to FIG. 10.

At 1510, the method may include determining the scheduling pattern of the second wireless device based on receiving the set of multiple data bursts. The operations of 1510 may be performed in accordance with examples as disclosed herein. In some examples, aspects of the operations of 1510 may be performed by a processing component 1045 as described with reference to FIG. 10.

At 1515, the method may include determining an average burst length of the set of multiple data bursts in the wake duration, where determining the scheduling pattern is based on determining the average burst length. The operations of 1515 may be performed in accordance with examples as disclosed herein. In some examples, aspects of the operations of 1515 may be performed by an averaging component 1025 as described with reference to FIG. 10.

At 1520, the method may include reducing the wake duration of the first wireless device based on modifying a bit rate of the first wireless device and the scheduling pattern of the second wireless device. The operations of 1520 may be performed in accordance with examples as disclosed herein. In some examples, aspects of the operations of 1520 may be performed by a termination component 1050 as described with reference to FIG. 10.

The following provides an overview of aspects of the present disclosure:

Aspect 1: A method for wireless communication, comprising: determining, within a time window, an average wake duration of a wireless device based at least in part on one or more wake durations of the wireless device over one or more previous time windows modifying a bit rate of a real-time stream at the wireless device based at least in part on the average wake duration and a threshold time period transmitting the real-time stream in accordance with the modified bit rate.

Aspect 2: The method of aspect 1, further comprising: determining a target wake duration for the real-time stream comparing the average wake duration to the target wake duration, wherein modifying the bit rate of the real-time stream is based at least in part on the comparing.

Aspect 3: The method of aspect 2, further comprising: determining that the average wake duration is shorter than the target wake duration, wherein modifying the bit rate of the real-time stream comprises increasing the bit rate of the real-time stream.

Aspect 4: The method of aspect 2, further comprising: determining that the average wake duration is longer than the target wake duration, wherein modifying the bit rate of the real-time stream comprises decreasing the bit rate of the real-time stream.

Aspect 5: The method of any of aspects 2 through 4, wherein the target wake duration is based at least in part on a latency threshold for the real-time stream, a quality threshold for the real-time stream, a power budget for the wireless device, or any combination thereof.

Aspect 6: The method of any of aspects 1 through 5, wherein modifying the bit rate of the real-time stream is based at least in part on a congestion level of a channel associated with the real-time stream.

Aspect 7: The method of any of aspects 1 through 6, wherein determining the average wake time service period utilization duration comprises: determining a moving average of a quantity of the one or more previous wake durations.

Aspect 8: The method of any of aspects 1 through 7, wherein determining the average wake time service period utilization duration further comprises: determining an average duration for a first recipient device associated with the real-time stream; and determining an average wake duration for a second recipient device associated with the real-time stream.

Aspect 9: The method of aspect 8, further comprising: inputting one or more parameters associated with the first recipient device to an encoder associated with the wireless device inputting one or more parameters associated with the second recipient device to the encoder associated with the wireless device, wherein modifying the bit rate of the real-time stream is based at least in part on inputting the one or more parameters associated with the first recipient device and the one or more parameters associated with the second recipient device to the encoder.

Aspect 10: The method of aspect 9, wherein the one or more parameters comprises a supported bit rate, an access time, a received signal strength indicator, the average wake duration, a quantity of attempts to re-establish connection with the wireless device, a quantity of packets dropped, or any combination thereof.

Aspect 11: The method of any of aspects 8 through 10, further comprising: determining a start time of a wake duration for the second recipient device, wherein the start time is offset by a target wake duration.

Aspect 12: The method of any of aspects 8 through 11, wherein the first recipient device comprises a left earbud and the second recipient device comprises a right earbud.

Aspect 13: The method of any of aspects 1 through 12, wherein the wireless device is connected to a home access point in a home network or a set of access points in a mesh home network.

Aspect 14: The method of any of aspects 1 through 13, wherein the real-time stream comprises an audio stream, a video stream, a phone call, haptic feedback, or any combination thereof.

Aspect 15: A method for wireless communication at a first wireless device, comprising: receiving, from a second wireless device, a plurality of data bursts in a wake duration and in accordance with a scheduling pattern, wherein each data burst of the plurality of data bursts comprises a set of data packets determining the scheduling pattern of the second wireless device based at least in part on receiving the plurality of data bursts; and reducing the wake duration of the first wireless device based at least in part on modifying a bit rate of the first wireless device and the scheduling pattern of the second wireless device.

Aspect 16: The method of aspect 15, further comprising: determining an average burst length of the plurality of data bursts in the wake duration, wherein determining the scheduling pattern is based at least in part on determining the average burst length.

Aspect 17: The method of aspect 16, further comprising: determining a first power usage value associated with receiving each data burst of the plurality of data bursts; and determining a second power usage value associated with refraining from receiving a last data burst of the plurality of data bursts, wherein reducing the wake duration of the first wireless device is based at least in part on determining the first power usage value and the second power usage value.

Aspect 18: The method of any of aspects 16 through 17, further comprising: excluding a last data burst of the plurality of data bursts in the wake duration based at least in part on the scheduling pattern, wherein determining the average burst length of the plurality of data bursts comprises determining an average burst length of a remaining quantity of data bursts of the plurality of data bursts in the wake duration.

Aspect 19: The method of aspect 18, further comprising: determining an average burst length of a last data burst of a plurality of previous wake durations, wherein excluding the last data burst of the plurality of data bursts in the wake duration is based at least in part on the average burst length.

Aspect 20: The method of aspect 19, wherein reducing the wake duration of the first wireless device is based at least in part on the average burst length of the last burst being shorter than the average burst length of the remaining quantity of data bursts.

Aspect 21: The method of any of aspects 15 through 20, wherein reducing the wake duration of the first wireless device is based at least in part on a threshold loss of quality for the first wireless device.

Aspect 22: The method of any of aspects 15 through 21, further comprising: determining a maximum burst size, wherein reducing the wake duration of the first wireless device is based at least in part on the maximum burst size.

Aspect 23: The method of any of aspects 15 through 22, further comprising: receiving, from at least one peripheral device, an indication of a modified bit rate of the first wireless device, wherein the modified bit rate is based at least in part on the plurality of data bursts, and wherein reducing the wake duration of the first wireless device is based at least in part on receiving the indication of the modified bit rate.

Aspect 24: An apparatus for wireless communication, comprising a processor; memory coupled with the processor; and instructions stored in the memory and executable by the processor to cause the apparatus to perform a method of any of aspects 1 through 14.

Aspect 25: An apparatus for wireless communication, comprising at least one means for performing a method of any of aspects 1 through 14.

Aspect 26: A non-transitory computer-readable medium storing code for wireless communication, the code comprising instructions executable by a processor to perform a method of any of aspects 1 through 14.

Aspect 27: An apparatus for wireless communication at a first wireless device, comprising a processor; memory coupled with the processor; and instructions stored in the memory and executable by the processor to cause the apparatus to perform a method of any of aspects 15 through 23.

Aspect 28: An apparatus for wireless communication at a first wireless device, comprising at least one means for performing a method of any of aspects 15 through 23.

Aspect 29: A non-transitory computer-readable medium storing code for wireless communication at a first wireless device, the code comprising instructions executable by a processor to perform a method of any of aspects 15 through 23.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The DL transmissions described herein may also be called forward link transmissions while the uplink (UL) transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. An apparatus for wireless communication, comprising:
at least one or more processors;

at least one or more memories coupled with the at least one or more processors; and
instructions stored in the at least one or more memories and executable by the at least one or more processors to cause the apparatus to:
determine, within a time window, an average wake duration of a wireless device based at least in part on one or more wake durations of the wireless device over one or more previous time windows;
modify a bit rate of a real-time stream at the wireless device based at least in part on the average wake duration and a threshold time period;
transmit the real-time stream in accordance with the modified bit rate;
wherein the instructions to determine the average wake duration are further executable by the at least one or more processors to cause the apparatus to:
determine an average duration for a first recipient device associated with the real-time stream; and
determine an average wake duration for a second recipient device associated with the real-time stream; and
wherein the first recipient device comprises a left earbud and the second recipient device comprises a right earbud.

2. The apparatus of claim 1, wherein the instructions are further executable by the at least one or more processors to cause the apparatus to:
determine a target wake duration for the real-time stream; and
compare the average wake duration to the target wake duration, wherein modifying the bit rate of the real-time stream is based at least in part on the comparing.

3. The apparatus of claim 2, wherein the instructions are further executable by the at least one or more processors to cause the apparatus to:
determine that the average wake duration is shorter than the target wake duration, wherein modifying the bit rate of the real-time stream comprises increasing the bit rate of the real-time stream.

4. The apparatus of claim 2, wherein the instructions are further executable by the at least one or more processors to cause the apparatus to:
determine that the average wake duration is longer than the target wake duration, wherein modifying the bit rate of the real-time stream comprises decreasing the bit rate of the real-time stream.

5. The apparatus of claim 2, wherein the target wake duration is based at least in part on a latency threshold for the real-time stream, a quality threshold for the real-time stream, a power budget for the wireless device, or any combination thereof.

6. The apparatus of claim 1, wherein modifying the bit rate of the real-time stream is based at least in part on a congestion level of a channel associated with the real-time stream.

7. The apparatus of claim 1, wherein the instructions to determine the average wake duration are executable by the at least one or more processors to cause the apparatus to:
determine a moving average of a quantity of one or more previous wake durations.

8. The apparatus of claim 1, wherein the instructions are further executable by the at least one or more processors to cause the apparatus to:
input one or more parameters associated with the first recipient device to an encoder associated with the wireless device; and input one or more parameters associated with the second recipient device to the encoder associated with the wireless device, wherein modifying the bit rate of the real-time stream is based at least in part on inputting the one or more parameters associated with the first recipient device and the one or more parameters associated with the second recipient device to the encoder.

9. The apparatus of claim 8, wherein the one or more parameters comprises a supported bit rate, an access time, a received signal strength indicator, the average wake duration, a quantity of attempts to re-establish connection with the wireless device, a quantity of packets dropped, or any combination thereof.

10. The apparatus of claim 1, wherein the instructions are further executable by the at least one or more processors to cause the apparatus to:

determine a start time of a wake duration for the second recipient device, wherein the start time is offset by a target wake duration.

11. The apparatus of claim 1, wherein the wireless device is connected to a home access point in a home network or a set of access points in a mesh home network.

12. The apparatus of claim 1, wherein the real-time stream comprises an audio stream, a video stream, a phone call, haptic feedback, or any combination thereof.

13. A method for wireless communication, comprising:

determining, within a time window, an average wake duration of a wireless device based at least in part on one or more wake durations of the wireless device over one or more previous time windows;

modifying a bit rate of a real-time stream at the wireless device based at least in part on the average wake duration and a threshold time period;

transmitting the real-time stream in accordance with the modified bit rate;

wherein the instructions to determine the average wake duration are further executable by the at least one or more processors to cause the apparatus to:

determine an average duration for a first recipient device associated with the real-time stream; and determine an average wake duration for a second recipient device associated with the real-time stream; and wherein the first recipient device comprises a left earbud and the second recipient device comprises a right earbud.

14. The method of claim 13, further comprising:

determining a target wake duration for the real-time stream; and comparing the average wake duration to the target wake duration, wherein modifying the bit rate of the real-time stream is based at least in part on the comparing.

15. The method of claim 14, further comprising:

determining that the average wake duration is shorter than the target wake duration, wherein modifying the bit rate of the real-time stream comprises increasing the bit rate of the real-time stream.

16. The method of claim 14, further comprising:

determining that the average wake duration is longer than the target wake duration, wherein modifying the bit rate of the real-time stream comprises decreasing the bit rate of the real-time stream.

17. The method of claim 13, wherein determining the average wake duration comprises:

determining a moving average of a quantity of one or more previous wake durations.

18. A non-transitory computer-readable medium storing code for wireless communication, the code comprising instructions executable by at least one or more processors to:

determine, within a time window, an average wake duration of a wireless device based at least in part on one or more wake durations of the wireless device over one or more previous time windows;

modify a bit rate of a real-time stream at the wireless device based at least in part on the average wake duration and a threshold time period;

transmit the real-time stream in accordance with the modified bit rate;

wherein the instructions to determine the average wake duration are further executable by the at least one or more processors to cause the apparatus to:

determine an average duration for a first recipient device associated with the real-time stream; and determine an average wake duration for a second recipient device associated with the real-time stream; and wherein the first recipient device comprises a left earbud and the second recipient device comprises a right earbud.

19. The non-transitory computer-readable medium of claim 18, wherein the instructions are further executable by the at least one or more processors to:

determine a target wake duration for the real-time stream; and compare the average wake duration to the target wake duration, wherein modifying the bit rate of the real-time stream is based at least in part on the comparing.

20. The non-transitory computer-readable medium of claim 18, wherein modifying the bit rate of the real-time stream is based at least in part on a congestion level of a channel associated with the real-time stream.

21. The non-transitory computer-readable medium of claim 18, wherein the instructions to determine the average wake duration are executable by the at least one or more processors to:

determine a moving average of a quantity of one or more previous wake durations.

22. An apparatus for wireless communication, comprising:

means for determining, within a time window, an average wake duration of a wireless device based at least in part on one or more wake durations of the wireless device over one or more previous time windows;

means for modifying a bit rate of a real-time stream at the wireless device based at least in part on the average wake duration and a threshold time period;

means for transmitting the real-time stream in accordance with the modified bit rate;

wherein the instructions to determine the average wake duration are further executable by the at least one or more processors to cause the apparatus to:

determine an average duration for a first recipient device associated with the real-time stream; and determine an average wake duration for a second recipient device associated with the real-time stream; and wherein the first recipient device comprises a left earbud and the second recipient device comprises a right earbud.

23. The apparatus of claim 22, further comprising:

means for determining a target wake duration for the real-time stream; and means for comparing the average wake duration to the target wake duration, wherein modifying the bit rate of the real-time stream is based at least in part on the comparing.

24. The apparatus of claim 22, wherein the wireless device is connected to a home access point in a home network or a set of access points in a mesh home network.

25. The apparatus of claim 22, wherein the real-time stream comprises an audio stream, a video stream, a phone call, haptic feedback, or any combination thereof.

\* \* \* \* \*